United States Patent
Zhou et al.

(10) Patent No.: US 11,109,256 B2
(45) Date of Patent: Aug. 31, 2021

(54) BEAM REPORTING IN A BEAM FAILURE RECOVERY REQUEST OR A BEAM FAILURE RECOVERY PROCEDURE

(71) Applicant: QUALCOMM Incorporated, San Diego, CA (US)

(72) Inventors: Yan Zhou, San Diego, CA (US); Tao Luo, San Diego, CA (US); Kiran Venugopal, Raritan, NJ (US); Tianyang Bai, Bridgewater, NJ (US)

(73) Assignee: UALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/742,725

(22) Filed: Jan. 14, 2020

(65) Prior Publication Data

US 2020/0245176 A1    Jul. 30, 2020

Related U.S. Application Data

(60) Provisional application No. 62/797,942, filed on Jan. 28, 2019.

(51) Int. Cl.
*H04W 24/10* (2009.01)
*H04B 7/0408* (2017.01)
*H04W 24/08* (2009.01)

(52) U.S. Cl.
CPC ......... *H04W 24/10* (2013.01); *H04B 7/0408* (2013.01); *H04W 24/08* (2013.01)

(58) Field of Classification Search
CPC ..... H04W 24/10; H04W 16/28; H04B 7/0408
See application file for complete search history.

(56) References Cited

U.S. PATENT DOCUMENTS

2018/0234960 A1    8/2018  Nagaraja
2018/0323856 A1*   11/2018 Xiong ................. H04B 7/088
(Continued)

OTHER PUBLICATIONS

Huawei, et al., "Beam Failure Recovery Design Details", 3GPP Draft, 3GPP TSG RAN WG1 Meeting #90bis, R1-1717302, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 2, 2017 (Oct. 2, 2017), XP051352214, 7 Pages, Retrieved from the Internet: URL: http://www.3gpp.org/ftp/tsg_ran/WG1_RL1/TSGR1_90b/Docs/, [retrieved on Oct. 2, 2017], 2.2 PRACH based BFRQ, 3 Conclusions.
(Continued)

*Primary Examiner* — Kent Krueger
(74) *Attorney, Agent, or Firm* — Holland & Hart LLP

(57) ABSTRACT

Methods, systems, and devices for wireless communication are described. Generally, the described techniques provide for efficiently determining when to transmit a beam report indicating a new beam for communicating with a base station after a current beam used for communications with the base station fails. In one example, after detecting beam failure, a user equipment (UE) may compare a quality of each candidate beam available for communicating with a base station to a beam identification threshold, and the UE may perform beam reporting based on the comparisons (e.g., refrain from transmitting a beam report if the quality of each of the candidate beams is lower than the beam identification threshold). In another example, after detecting beam failure, a UE may compare a quality of each candidate beam available for communicating with a base station to a beam detection threshold, and the UE may perform beam reporting based on the comparisons.

16 Claims, 15 Drawing Sheets

(56) References Cited

U.S. PATENT DOCUMENTS

| | | | |
|---|---|---|---|
| 2019/0190582 A1* | 6/2019 | Guo | H04B 7/0626 |
| 2019/0230545 A1* | 7/2019 | Liou | H04W 16/28 |
| 2019/0253986 A1* | 8/2019 | Jeon | H04W 76/19 |
| 2020/0059285 A1* | 2/2020 | Zhang | H04W 24/10 |
| 2020/0059397 A1* | 2/2020 | da Silva | H04B 7/0617 |
| 2020/0107331 A1* | 4/2020 | Tsai | H04W 72/085 |

OTHER PUBLICATIONS

Huawei, et al., "Beam Failure Recovery for Scell", 3GPP Draft, R1-1813561, 3GPP TSG RAN WG1 Meeting #95, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 3, 2018 (Nov. 3, 2018), XP051479899, 7 Pages, Retrieved from the Internet:—URL: http://www.3gpp.org/ftp/tsg%5Fran/WG1%5FRL1/TSGR1%5F95/Docs/R1%2D1813561%2Ezip, [retrieved on Nov. 3, 2018], 2.1 Scenario for beam failure recovery for SCell, figure 4 2.2.2, New candidate beam identification, 2.2.3 Beam failure recovery (BFRQ).

International Search Report and Written Opinion—PCT/US2020/013632—ISA/EPO—Apr. 8, 2020 (191359WO).

Vivo: "Remaining Details on Mechanism to Recover from Beam Failure", 3GPP Draft, 3GPP TSG RAN WG1 Meeting #91, R1-1719770 Remaining Details on Mechanism to Recover from Beam Failure, 3rd Generation Partnership Project (3GPP), Mobile Competence Centre, 650, Route Des Lucioles, F-06921 Sophia-Antip, vol. RAN WG1, No. Reno, USA, Nov. 27, 2017-Dec. 1, 2017, Nov. 18, 2017 (Nov. 18, 2017), XP051369513, 6 Pages, Retrieved from the Internet: URL: http://www.3gpp.org/ftp/tsg%5Fran/WG1%5FRL1/TSGR1%5F91/Docs/, [retrieved on Nov. 18, 2017], 2.1 Beam failure event, 2.2 Candidate beam identification, 2.3 Beam failure recovery, 3 Conclusion.

\* cited by examiner

BEAM REPORTING IN A BEAM FAILURE RECOVERY REQUEST OR A BEAM FAILURE RECOVERY PROCEDURE

CROSS REFERENCE

The present application for patent claims the benefit of U.S. Provisional Patent Application No. 62/797,942 by Zhou et al., entitled "BEAM REPORTING IN A BEAM FAILURE RECOVERY REQUEST OR A BEAM FAILURE RECOVERY PROCEDURE," filed Jan. 28, 2019, assigned to the assignee hereof, and expressly incorporated by reference in its entirety herein.

BACKGROUND

The following relates generally to wireless communications and more specifically to beam reporting in a beam failure recovery request (BFRQ) or a beam failure recovery (BFR) procedure.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a UE may communicate with a base station using one or more beams. In such systems, a beam used for communications between a base station and a UE may fail, and it may be appropriate for the UE to perform a beam recovery procedure (e.g., if it is possible to recover a beam for communications). Conventional techniques for performing beam recovery may be deficient.

SUMMARY

The described techniques relate to improved methods, systems, devices, and apparatuses that support beam reporting in a beam failure recovery request (BFRQ) or a beam failure recovery (BFR) procedure. Generally, the described techniques provide for efficiently determining whether to transmit a beam report indicating a new beam for communicating with a base station after a current beam used for communications with the base station fails. In one example, after detecting beam failure, a user equipment (UE) may compare a quality of each candidate beam available for communicating with a base station to a beam identification threshold, and the UE may perform beam reporting based on the comparisons (e.g., refrain from transmitting a beam report if the quality of each of the candidate beams is lower than the beam identification threshold). In another example, after detecting beam failure, a UE may compare a quality of each candidate beam available for communicating with a base station to a beam detection threshold, and the UE may perform beam reporting based on the comparisons.

A method for wireless communication at a UE is described. The method may include detecting a beam failure of a beam used for communicating with a base station, identifying one or more candidate beams available for communicating with the base station, the one or more candidate beams being different from the failed beam, and refraining from transmitting a beam report identifying a new beam for communicating with the base station based on a quality of each of the candidate beams being lower than a beam identification threshold.

A method for wireless communication at a UE is described. The method may include detecting a beam failure of a beam used for communicating with a base station, identifying one or more candidate beams available for communicating with the base station, the one or more candidate beams being different from the failed beam, comparing a quality of each of the candidate beams to a beam detection threshold in an attempt to identify a new beam for communicating with the base station, and performing beam reporting based on the comparing.

A method for wireless communication at a base station is described. The method may include identifying a beam used for communicating with a UE, transmitting a beam reporting configuration to the UE indicating whether the UE should transmit an indication of a quality of a new beam along with an indication of the new beam in a beam report when the beam used for communicating with the UE fails, and receiving the beam report from the UE in accordance with the beam reporting configuration when the beam used for communicating with the UE fails.

DETAILED DESCRIPTION

In some wireless communications systems, a user equipment (UE) may communicate with a base station using one or more beams. In the event of a beam failure, it may be appropriate for a UE to identify and report a new beam for communicating with the base station (e.g., if a candidate beam with suitable quality is available for communications with the base station). For instance, after a beam failure of a beam used for communicating with a base station (e.g., secondary cell (SCell)), a UE may declare beam failure and identify a new candidate beam in or after a beam failure recovery request (BFRQ). In some cases, however, it may be challenging for a UE to perform beam reporting since the UE may or may not identify a suitable beam for communicating with a base station, and the decision on whether to report a new beam for communicating with the base station may depend on multiple thresholds (e.g., a detection threshold and a beam identification threshold).

As described herein, a UE may support efficient techniques for determining whether to transmit a beam report (e.g., in a beam failure recovery request (BFRQ) or a beam failure recovery (BFR) procedure) indicating a new beam for communicating with a base station after a current beam used for communications with the base station fails. In one example, after detecting beam failure, a UE may compare a quality of each available candidate beam (e.g., available for communicating with a base station) to a beam identification threshold, and the UE may perform beam reporting based on the comparisons (e.g., refrain from transmitting a beam report if the quality of each of the candidate beams is lower than the beam identification threshold). In another example, after detecting beam failure, a UE may compare a quality of each available candidate beam (e.g., available for communicating with a base station) to a beam detection threshold, and the UE may perform beam reporting based on the comparisons.

Aspects of the disclosure introduced herein are described below in the context of wireless communications systems. Examples of processes and signaling exchanges that support beam reporting in a BFRQ or a BFR procedure are then described. Aspects of the disclosure are further illustrated by and described with reference to apparatus diagrams, system diagrams, and flowcharts that relate to beam reporting in a BFRQ or a BFR procedure.

Figure 1:
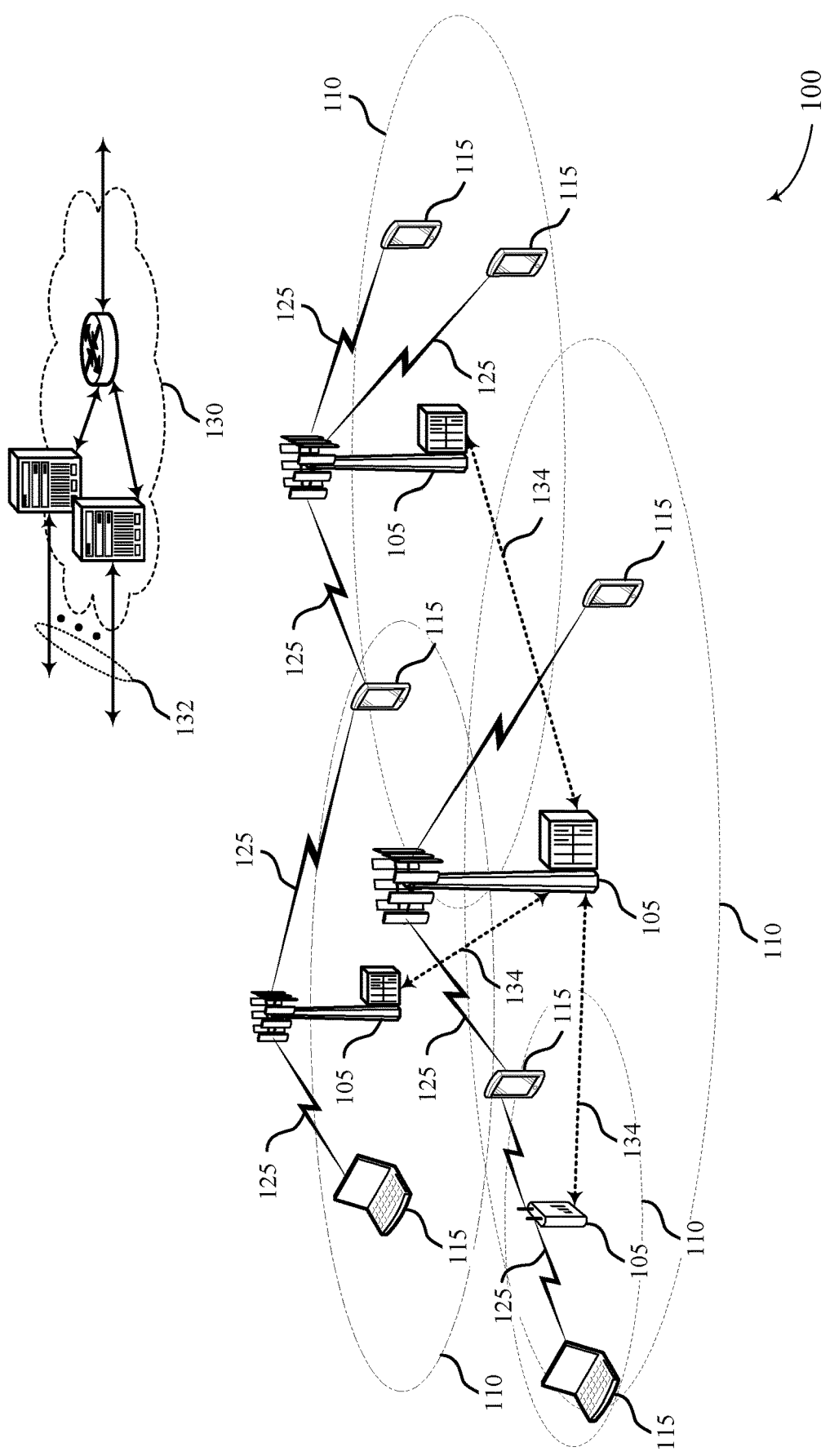
FIGS. 1 and 2 illustrate examples of wireless communications systems that support beam reporting in a beam failure recovery request (BFRQ) or a beam failure recovery (BFR) procedure in accordance with aspects of the present disclosure.

FIG. 1 illustrates an example of a wireless communications system 100 that supports beam reporting in a BFRQ or a BFR procedure in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an frequency division duplexing (FDD) mode), or be configured to carry downlink and uplink communications (e.g., in a time-division duplexing (TDD) mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on FDD, TDD, or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing.

The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

As described herein, wireless communications system 100 may support communications between a UE 115 and a base station 105 (e.g., an SCell) using one or more beams. In the event of a beam failure, it may be appropriate for a UE 115 to identify and report a new beam for communicating with the base station (e.g., if a candidate beam with suitable quality is available for communications with the base station). In one aspect (e.g., for SCell BFR), the UE 115 may declare beam failure and identify a new candidate beam in or after a BFRQ. In this aspect, the UE 115 may report new beam information by or after a BFRQ, and reference signals for new candidate downlink beams may be configured (e.g., using RRC signaling or in a MAC control element (MAC-CE)) and may be based on channel state information reference signals (CSI-RSs) or synchronization signal blocks (SSBs) (e.g., in a same component carrier as or a different component carrier from a current component carrier used for communications between UE 115 and a base station 105).

In another aspect (e.g., for SCell BFR), the UE 115 may declare beam failure in a BFRQ. In this aspect, the UE 115 may declare beam failure in the BFRQ, and the UE 115 may provide new beam identification in a downlink beam management procedure. In yet another aspect (e.g., for SCell BFR), the UE 115 may transmit a BFRQ if the UE declares beam failure. In this aspect, the UE 115 may report new beam information during a BFR procedure, and reference signals for new candidate downlink beams may be configured (e.g., using RRC signaling or in a MAC-CE) and may be based on CSI-RSs or SSBs (e.g., in a same component carrier as or a different component carrier from a current component carrier used for communications between UE 115 and a base station 105. The UE 115 may determine whether or not to declare beam failure and provide an indication of a new beam in parallel.

In some cases, however, it may be challenging for a UE 115 to perform beam reporting since the UE 115 may or may not identify a suitable beam for communicating with a base station, and the decision on whether to report a new beam for communicating with the base station may depend on multiple thresholds. For instance, the decision on whether to report a new beam for communicating with the base station 105 may depend on a detection threshold (e.g., a threshold used to detect whether a beam is suitable for communications with a base station 105 based on UE capability) or a beam identification threshold (e.g., a threshold used to otherwise detect whether a beam is suitable for communications with a base station 105). UEs 115 in wireless communications system 100 may support efficient techniques for determining whether to transmit a beam report (e.g., in a BFRQ or a BFR procedure) indicating a new beam for communicating with a base station 105 after a current beam used for communications with the base station 105 fails.

The actions performed by the UE 115 as described herein may be implemented to realize one or more potential advantages. One implementation may allow a UE 115 to save power and increase battery life by improving the process of beam selection and reselection. For example, a UE 115 may have improved quality and reliability of service based on efficiently reporting beam failures and performing measurements of other beams in order to improve wireless communications at the UE 115.

Figure 2:
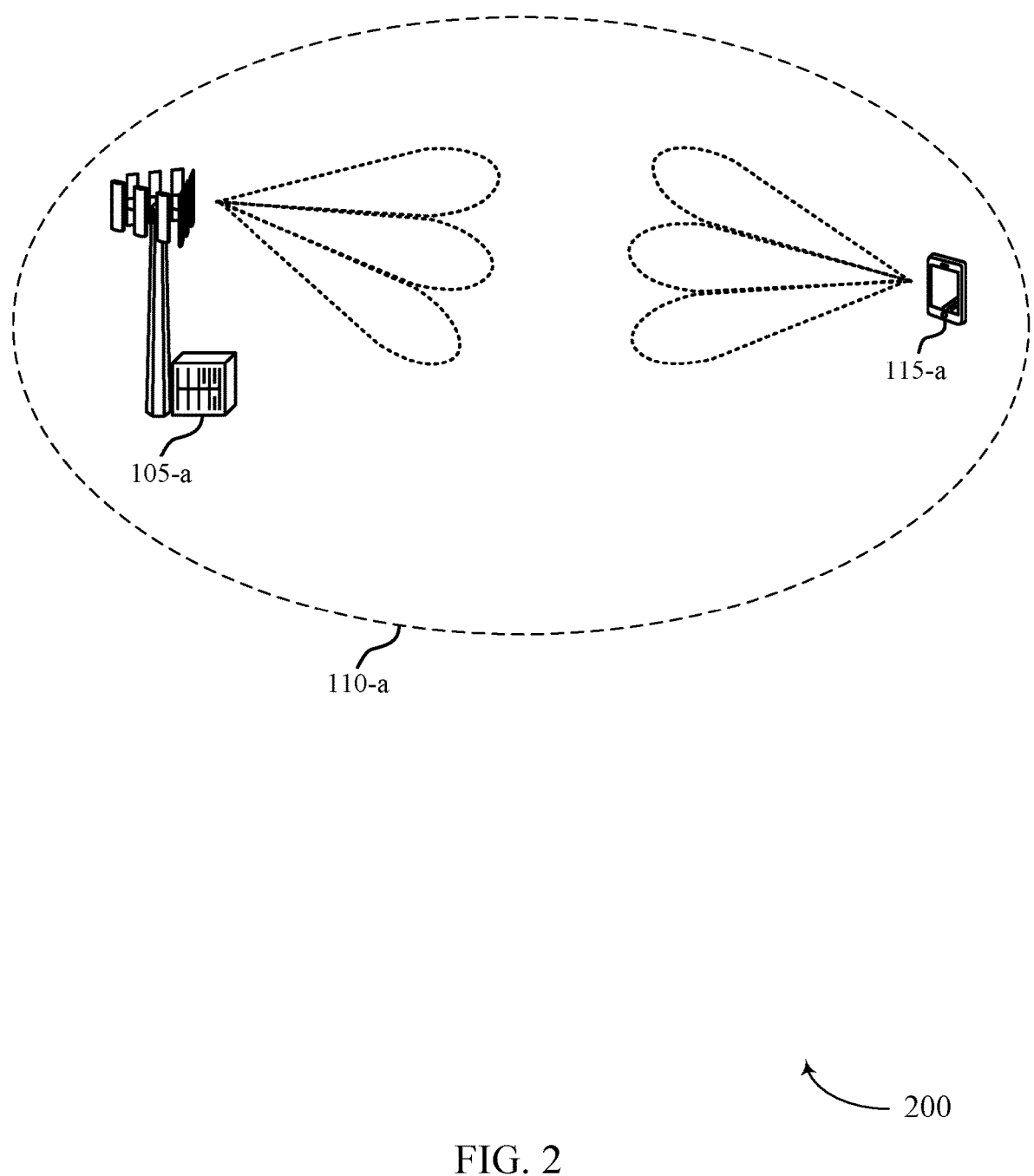

FIG. 2 illustrates an example of a wireless communications system 200 that supports beam reporting in a BFRQ or a BFR procedure in accordance with aspects of the present disclosure. Wireless communications system 200 includes base station 105-a, which may be an example of a base station 105 described with reference to FIG. 1. Wireless communications system 200 also includes UE 115-a, which may be an example of a UE 115 described with reference to FIG. 1. Base station 105-a may provide communication coverage for a respective coverage area 110-a, which may be an example of a coverage area 110 described with reference to FIG. 1. Wireless communications system 200 may implement aspects of wireless communications system 100. For example, UE 115-a in wireless communications system 200 may support efficient techniques for determining whether to transmit a beam report indicating a new beam for communicating with base station 105-a after a current beam used for communications with base station 105-a fails.

In one aspect, after detecting beam failure, UE 115-a may compare a quality (e.g., reference signal received power (RSRP)) of each candidate beam available for communicating with base station 105-a to a beam identification threshold, and UE 115-a may perform beam reporting based on the comparisons. For instance, if UE 115-a determines that the quality of a candidate beam is above the beam identification threshold, UE 115-a may transmit a beam report (e.g., in or after a BFRQ) identifying the candidate beam as a new beam for communicating with base station 105-a. In some cases, UE 115-a may also include an indication of the quality of the candidate beam in the beam report. Alternatively, if UE 115-a determines that the quality of each candidate beam is lower than the beam identification threshold, UE 115-a may refrain from transmitting a beam report identifying a new beam for communicating with base station 105-a.

In another aspect, after detecting beam failure, UE 115-a may compare a quality (e.g., RSRP) of each candidate beam available for communicating with base station 105-a to a beam detection threshold, and UE 115-a may perform beam reporting based on the comparisons. For instance, if UE 115-a determines that the quality of a candidate beam is above the beam detection threshold, UE 115-a may transmit a beam report (e.g., in or after a BFRQ) identifying the candidate beam as a new beam for communicating with base station 105-a (e.g., regardless of whether the quality of the candidate beam is above a beam identification threshold). In some cases, UE 115-a may also include an indication of the quality of the candidate beam in the beam report. Alternatively, if UE 115-a determines that the quality of each candidate beam is lower than the beam detection threshold, UE 115-a may indicate to base station 105-a that none of the candidate beams are suitable for communicating with base station 105-a (e.g., using one of a number of techniques).

UE 115-a may transmit a BFRQ including an indication of a beam failure. UE 115-a may receive an uplink grant from base station 105-a. UE 115-a may then transmit the beam report in or after the BFRQ to base station 105-a based on the uplink grant, where the beam report may include MAC-CE signaling.

In one example, UE 115-a may refrain from transmitting a beam report identifying a new beam for communicating with base station 105-a. In another example, UE 115-a may transmit a beam report indicating that no new beam is identified for communicating with base station 105-a (e.g., by transmitting a reserved beam index value or a reserved beam quality value, such as a minimum reported RSRP value or a fixed value (e.g., −100 dBm)). In this example, base station 105-a may receive the beam report indicating that no new beam is identified for communicating with base station 105-a, and base station 105-a may initiate a BFR procedure to identify a new beam for communicating with UE 115-a. In yet another example, UE 115-a may transmit a beam report indicating that no new beam is identified for communicating with the base station 105-a and that communications with the base station 105-a is unrecoverable. In this example, base station 105-a may receive the beam report indicating that no new beam is identified for communicating with base station 105-a and that communications with base station 105-a is unrecoverable, and base station 105-a may refrain from initiating a BFR procedure to identify a new beam for communicating with UE 115-a.

Figure 3:
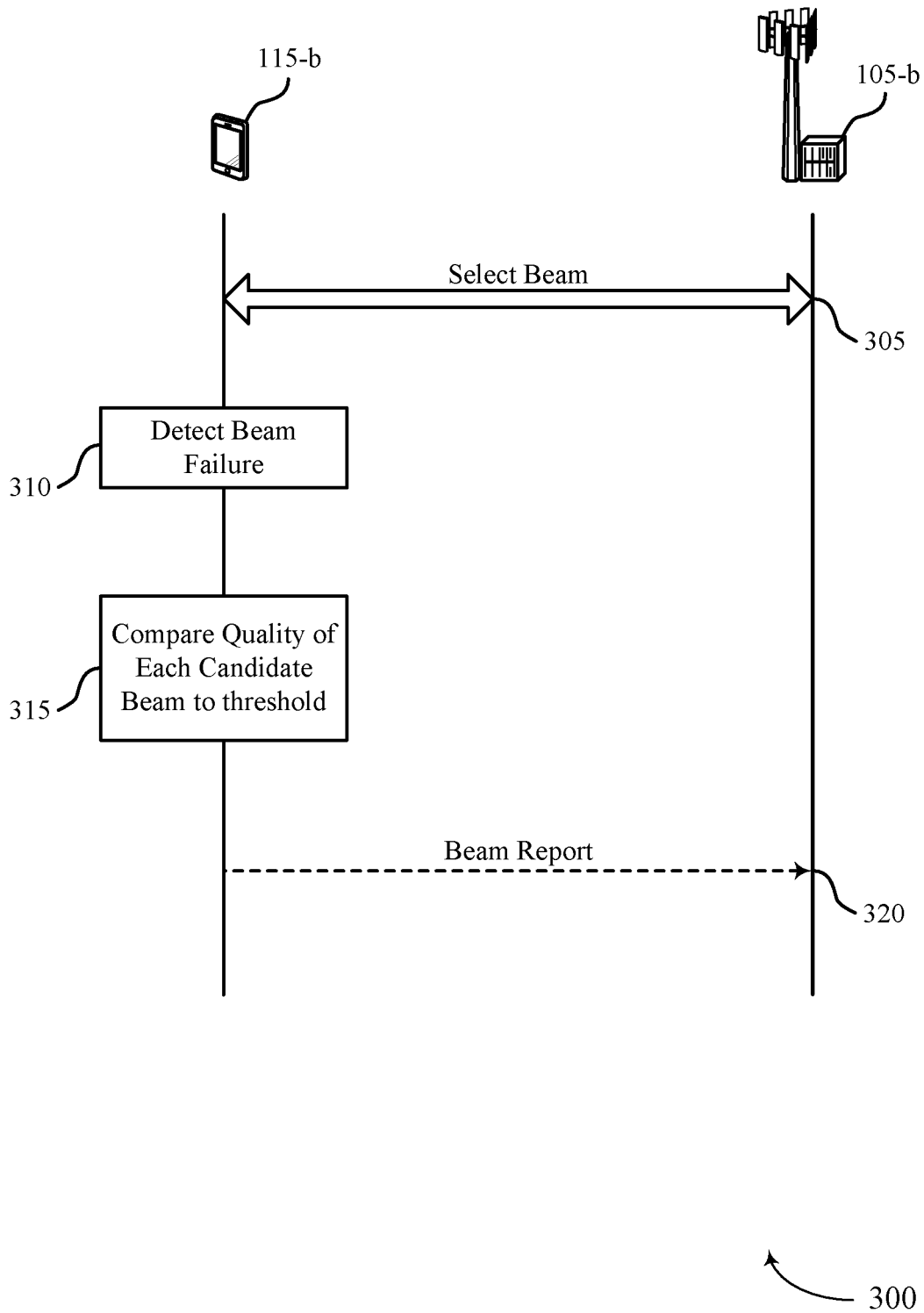
FIG. 3 illustrates an example of a process flow that supports beam reporting in a BFRQ or a BFR procedure in accordance with aspects of the present disclosure.

FIG. 3 illustrates an example of a process flow 300 that supports beam reporting in a BFRQ or a BFR procedure in accordance with aspects of the present disclosure. Process flow 300 illustrates aspects of techniques performed by a base station 105-*b* (e.g., an SCell), which may be an example of a base station 105 described with reference to FIGS. 1 and 2. Process flow 300 also illustrates aspects of techniques performed by UE 115-*b*, which may be an example of a UE 115 described with reference to FIGS. 1 and 2. In the examples described herein, a beam report may refer to a message used to report a new beam for communications between UE 115-*b* and base station 105-*b*, and the beam report may be transmitted by UE 115-*b* in a BFRQ or after the BFRQ (e.g., in a BFR procedure).

At 305, UE 115-*b* may communicate with base station 105-*b* to select a beam for communications. At 310, UE 115-*b* may identify that the beam used for communicating with base station 105-*b* has failed (e.g., based on failing to receive a scheduled downlink transmission). Accordingly, it may be appropriate for UE 115-*b* to identify and report a new beam for communicating with base station 105-*b* (e.g., if a suitable beam is available for communicating with base station 105-*b*). At 315, UE 115-*b* may identify one or more candidate beams available for communicating with base station 105-*b*, the one or more candidate beams being different from the current beam selected for communicating with base station 105-*b* (e.g., at 305), and UE 115-*b* may compare the quality of each of the candidate beams to a beam identification threshold or a detection threshold (e.g., where the detection threshold is based on UE capability and is different from (e.g., lower than) the beam identification threshold) to determine whether to report a candidate beam for future communications with base station 105-*b*.

In one example, UE 115-*b* may compare the quality of each of the candidate beams to the beam identification threshold, and UE 115-*b* may perform beam reporting based on the comparisons. If the UE 115-*b* determines that the quality of a candidate beam is above the beam identification threshold, at 320, UE 115-*b* may transmit a beam report (e.g., in or after a BFRQ) identifying the candidate beam as a new beam for communicating with the base station 105-*b*. Alternatively, if the UE 115-*b* determines that the quality of each of the candidate beams is lower than the beam identification threshold, UE 115-*b* may refrain from transmitting a beam report identifying a new beam for communicating with the base station 105-*b* (i.e., based on the quality of each of the candidate beams being lower than the beam identification threshold).

In another example, UE 115-*b* may compare the quality of each of the candidate beams to the detection threshold, and UE 115-*b* may perform beam reporting based on the comparisons. If the UE 115-*b* determines that the quality of a candidate beam is above the detection threshold, UE 115-*b* may transmit a beam report (e.g., in or after a BFRQ) identifying the candidate beam as a new beam for communicating with the base station 105-*b* (e.g., regardless of whether the quality of the candidate beam is above or below the beam identification threshold). Alternatively, if the UE 115-*b* determines that the quality of each of the candidate beams is lower than the beam identification threshold, UE 115-*b* may refrain from transmitting a beam report identifying a new beam for communicating with the base station 105-*b*, transmit a beam report indicating that no new beam is identified for communicating with the base station 105-*b* (e.g., by transmitting a reserved beam index value or a reserved beam quality value), or transmit a beam report indicating that no new beam is identified for communicating with the base station 105-*b* and that communications with the base station 105-*b* is unrecoverable. In some cases, UE 115-*b* may transmit, to base station 105-*b*, a BFRQ including an indication of beam failure. UE 115-*b* may receive an uplink grant from base station 105-*b*, and UE 115-*b* may then transmit the beam report in or after the BFRQ to base station 105-*b* based on the uplink grant, where the beam report may include MAC-CE signaling. For example, the beam report may be carried by MAC-CE signaling.

If base station 105-*b* receives a beam report indicating that no new beam is identified for communicating with the base station 105-*b* (e.g., with no indication that communications with the base station 105-*b* is unrecoverable), base station 105-*b* may initiate a beam failure recovery procedure to identify a new beam for communicating with UE 115-*b*. Alternatively, if base station 105-*b* receives a beam report indicating that no new beam is identified for communicating with the base station 105-*b* and that communications with the base station 105-*b* is unrecoverable, base station 105-*b* may refrain from initiating a beam failure recovery procedure to identify a new beam for communicating with UE 115-*b*. In some cases, base station 105-*b* may transmit and UE 115-*b* may receive a beam reporting configuration indicating whether UE 115-*b* should transmit an indication of a quality of a candidate beam in a beam report (e.g., when identifying the candidate beam as a new beam for communicating with the base station 105-*b*), and UE 115-*b* may transmit or refrain from transmitting the indication of the quality of the candidate beam in a beam report transmitted to base station 105-*b* based on the beam reporting configuration.

Figure 4:
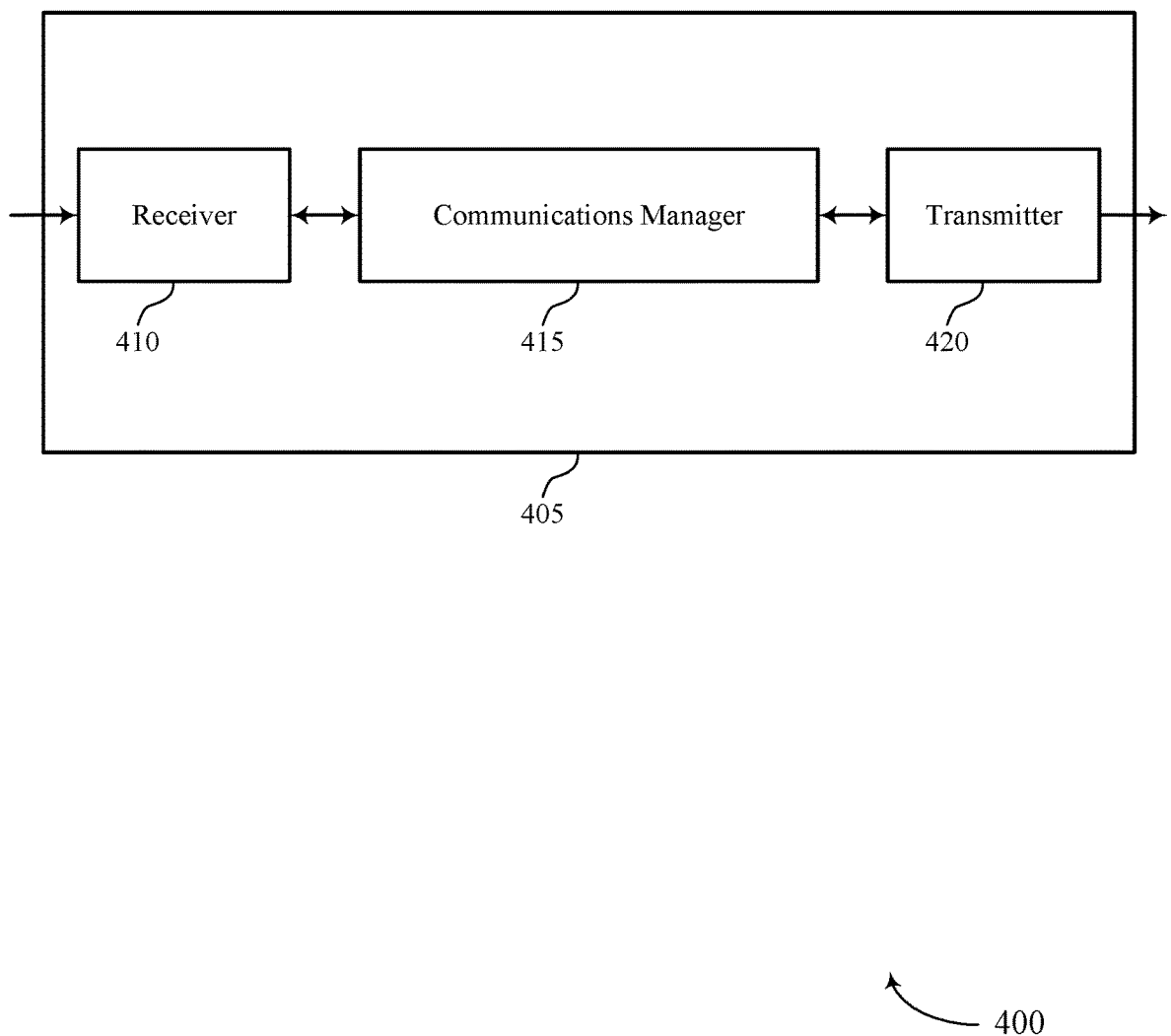
FIGS. 4 and 5 show block diagrams of devices that support beam reporting in a BFRQ or a BFR procedure in accordance with aspects of the present disclosure.

FIG. 4 shows a block diagram 400 of a device 405 that supports beam reporting in a BFRQ or a BFR procedure in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to beam reporting in a BFRQ or a BFR procedure, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may detect a beam failure of a beam used for communicating with a base station, identify one or more candidate beams available for communicating with the base station, the one or more candidate beams being different from the failed beam, and refrain from transmitting a beam report identifying a new beam for communicating with the base station based on a quality of each of the candidate beams being lower than a beam identification threshold. The communications manager 415 may also detect a beam failure of a beam used for communicating with a base station, identify one or more candidate beams available for communicating with the base station, the one or more candidate beams being different from the failed beam, compare a quality of each of the candidate beams to a beam detection threshold in an attempt to identify a new beam for communicating with the base station, and perform beam reporting based on the comparing. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 described herein may be implemented as a chipset of a wireless modem, and the receiver 410 and the transmitter 420 may be implemented as sets of analog components (e.g., amplifiers, filters, phase shifters, antennas, etc.) The wireless modem may obtain and decode signals from the receiver 410 over a receive interface, and may output signals for transmission to the transmitter 420 over a transmit interface.

Figure 5:
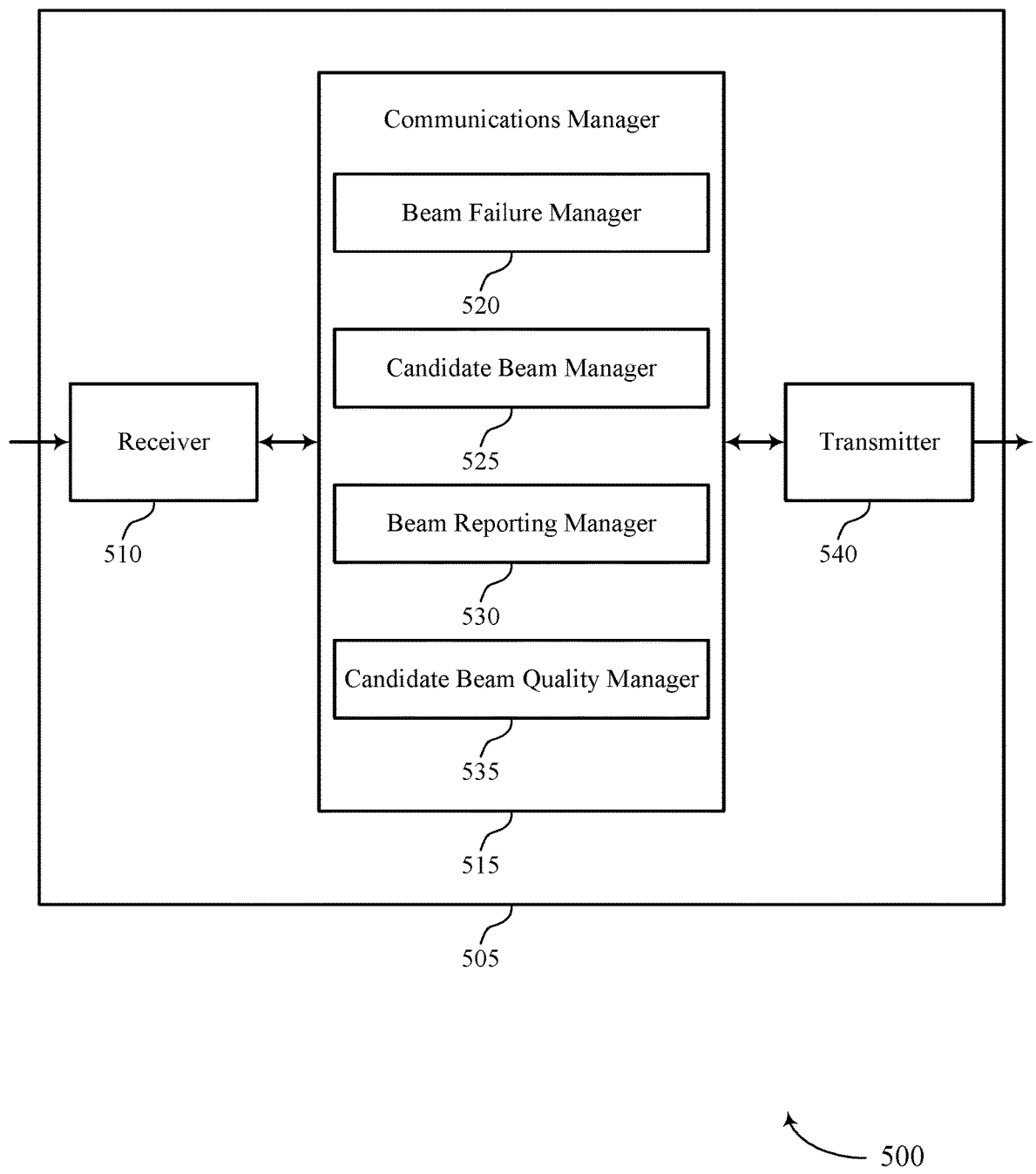

The actions performed by the communications manager 415 as described herein may be implemented to realize one or more potential advantages. One implementation may allow a UE 115 to save power and increase battery life by improving the process of beam selection and reselection. For example, a UE 115 may have improved quality and reliability of service based on efficiently reporting beam failures and performing measurements of other beams in order to improve wireless communications at the UE 115, FIG. 5 shows a block diagram 500 of a device 505 that supports beam reporting in a BFRQ or a BFR procedure in accordance with aspects of the present disclosure. The device 505 may be an example of aspects of a device 405, or a UE 115 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to beam reporting in a BFRQ or a BFR procedure, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a beam failure manager 520, a candidate beam manager 525, a beam reporting manager 530, and a candidate beam quality manager 535. The communications manager 515 may be an example of aspects of the communications manager 710 described herein.

The beam failure manager 520 may detect a beam failure of a beam used for communicating with a base station. The candidate beam manager 525 may identify one or more candidate beams available for communicating with the base station, the one or more candidate beams being different from the failed beam. The beam reporting manager 530 may refrain from transmitting a beam report identifying a new beam for communicating with the base station based on a quality of each of the candidate beams being lower than a beam identification threshold.

The beam failure manager 520 may detect a beam failure of a beam used for communicating with a base station. The candidate beam manager 525 may identify one or more candidate beams available for communicating with the base station, the one or more candidate beams being different from the failed beam. The candidate beam quality manager 535 may compare a quality of each of the candidate beams to a beam detection threshold in an attempt to identify a new beam for communicating with the base station. The beam reporting manager 530 may perform beam reporting based on the comparing.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

A processor of a UE 115 may (e.g., controlling the receiver 510, the transmitter 540, or the transceiver 720 as described with reference to 7) may efficiently operate to save power and increase battery life of the UE 115. For example, the processor of the UE 115 may efficiently operate the receiver 510 to detect a beam failure of a beam that may be used for communication with a base station 105. The processor may also efficiently operate the transmitter 540 to perform beam reporting based on a comparison of beam quality. These functions performed by the processor may decrease latency and communication failures at the UE 115 by avoiding extensive beam failures and efficiently responding to beam failures.

Figure 6:
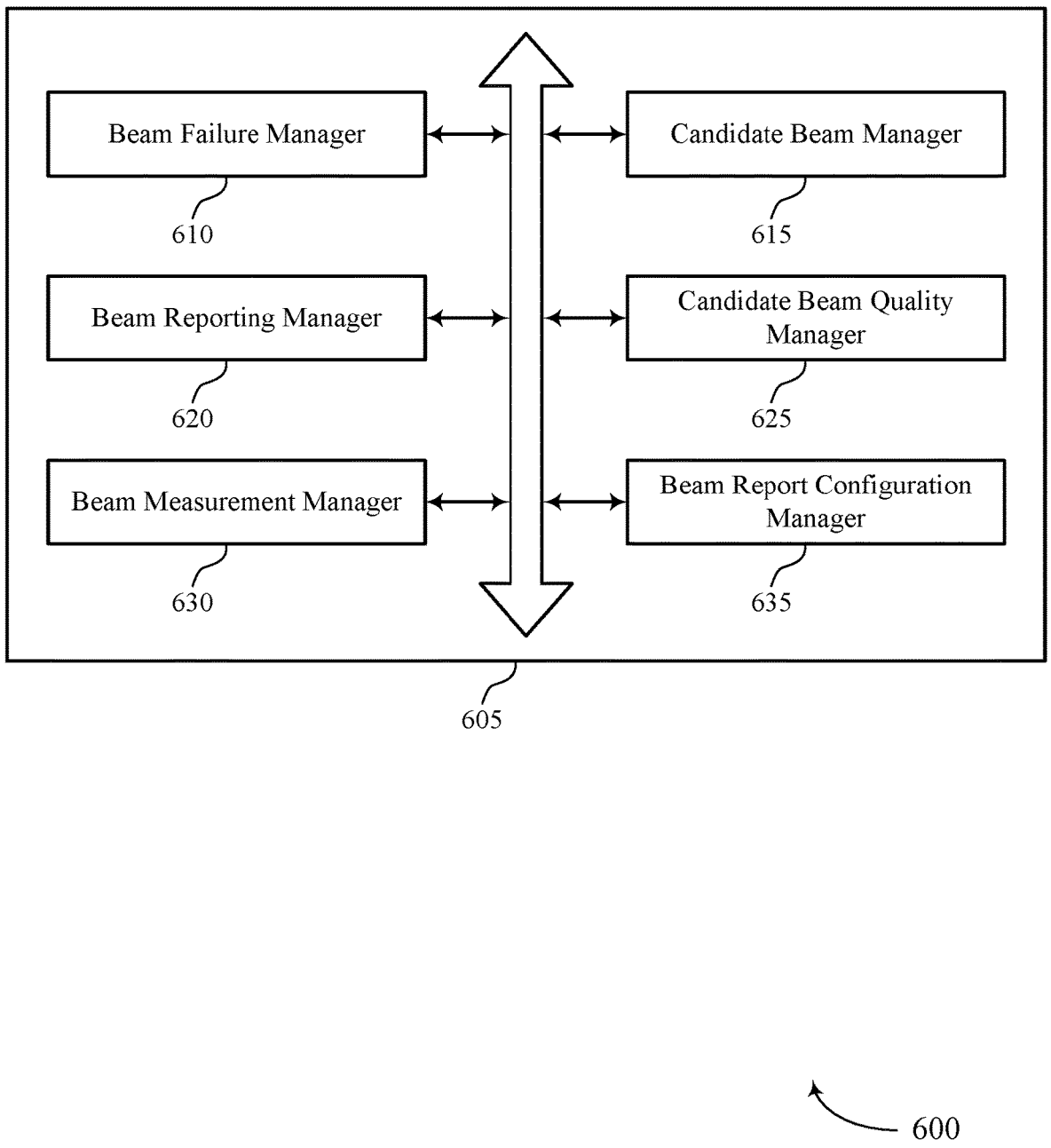
FIG. 6 shows a block diagram of a communications manager that supports beam reporting in a BFRQ or a BFR procedure in accordance with aspects of the present disclosure.

FIG. 6 shows a block diagram 600 of a communications manager 605 that supports beam reporting in a BFRQ or a BFR procedure in accordance with aspects of the present disclosure. The communications manager 605 may be an example of aspects of a communications manager 415, a communications manager 515, or a communications manager 710 described herein. The communications manager 605 may include a beam failure manager 610, a candidate beam manager 615, a beam reporting manager 620, a candidate beam quality manager 625, a beam measurement manager 630, and a beam report configuration manager 635. Each of these modules may communicate, directly or indirectly, with one another (e.g., via one or more buses).

The beam failure manager 610 may detect a beam failure of a beam used for communicating with a base station. In some examples, the beam failure manager 610 may detect a beam failure of a beam used for communicating with a base station. In some cases, the base station includes a secondary cell. The candidate beam manager 615 may identify one or more candidate beams available for communicating with the base station, the one or more candidate beams being different from the failed beam. In some examples, the candidate beam manager 615 may identify one or more candidate beams available for communicating with the base station, the one or more candidate beams being different from the failed beam.

The beam reporting manager 620 may refrain from transmitting a beam report identifying a new beam for communicating with the base station based on a quality of each of the candidate beams being lower than a beam identification threshold. In some examples, the beam reporting manager 620 may perform beam reporting based on the comparing. In some examples, the beam reporting manager 620 may transmit a beam report identifying the candidate beam as the new beam for communicating with the base station regardless of whether the quality of the candidate beam of the one or more candidate beams is above or below a beam identification threshold. In some examples, the beam reporting manager 620 may transmit the beam report in or after a BFRQ to the base station.

In some examples, the beam reporting manager 620 may transmit the indication of the quality of the candidate beam of the one or more candidate beams in the beam report based on the determining. In some examples, the beam reporting manager 620 may refrain from transmitting a beam report identifying a new beam for communicating with the base station based on the determining. In some examples, the beam reporting manager 620 may transmit a beam report indicating that no new beam is identified for communicating with the base station. In some examples, the beam reporting manager 620 may transmit a reserved beam index value or a reserved beam quality value in the beam report to indicate that no new beam is identified for communicating with the base station. In some examples, the beam reporting manager 620 may transmit a beam report indicating that no new beam is identified for communicating with the base station and that communications with the base station is unrecoverable.

The candidate beam quality manager 625 may compare a quality of each of the candidate beams to a beam detection threshold in an attempt to identify a new beam for communicating with the base station. In some examples, the candidate beam quality manager 625 may compare the quality of each of the candidate beams to the beam identification threshold based on detecting the beam failure. In some examples, the candidate beam quality manager 625 may determine that the quality of each of the candidate beams is lower than the beam identification threshold, where the refraining is based on the determining. In some examples, the candidate beam quality manager 625 may determine that the quality of a candidate beam of the one or more candidate beams is above the detection threshold. In some examples, the candidate beam quality manager 625 may determine that the quality of each of the candidate beams is lower than the detection threshold, where the attempt to identify the new beam for communicating with the base station has failed. In some cases, the detection threshold is based on a capability of the UE and is different from the beam identification threshold.

The beam measurement manager 630 may measure the quality of each of the candidate beams. In some cases, the quality of each of the candidate beams includes a reference signal received power. The beam report configuration manager 635 may receive a beam reporting configuration indicating whether the UE should transmit an indication of a quality of a new beam to be used for communicating with the base station in a beam report. In some examples, the beam report configuration manager 635 may receive a beam reporting configuration indicating whether the UE should transmit an indication of the quality of the candidate beam of the one or more candidate beams in the beam report. In some examples, the beam report configuration manager 635 may determine that the beam reporting configuration indicates that the UE should transmit the indication of the quality of the candidate beam of the one or more candidate beams in the beam report.

Figure 7:
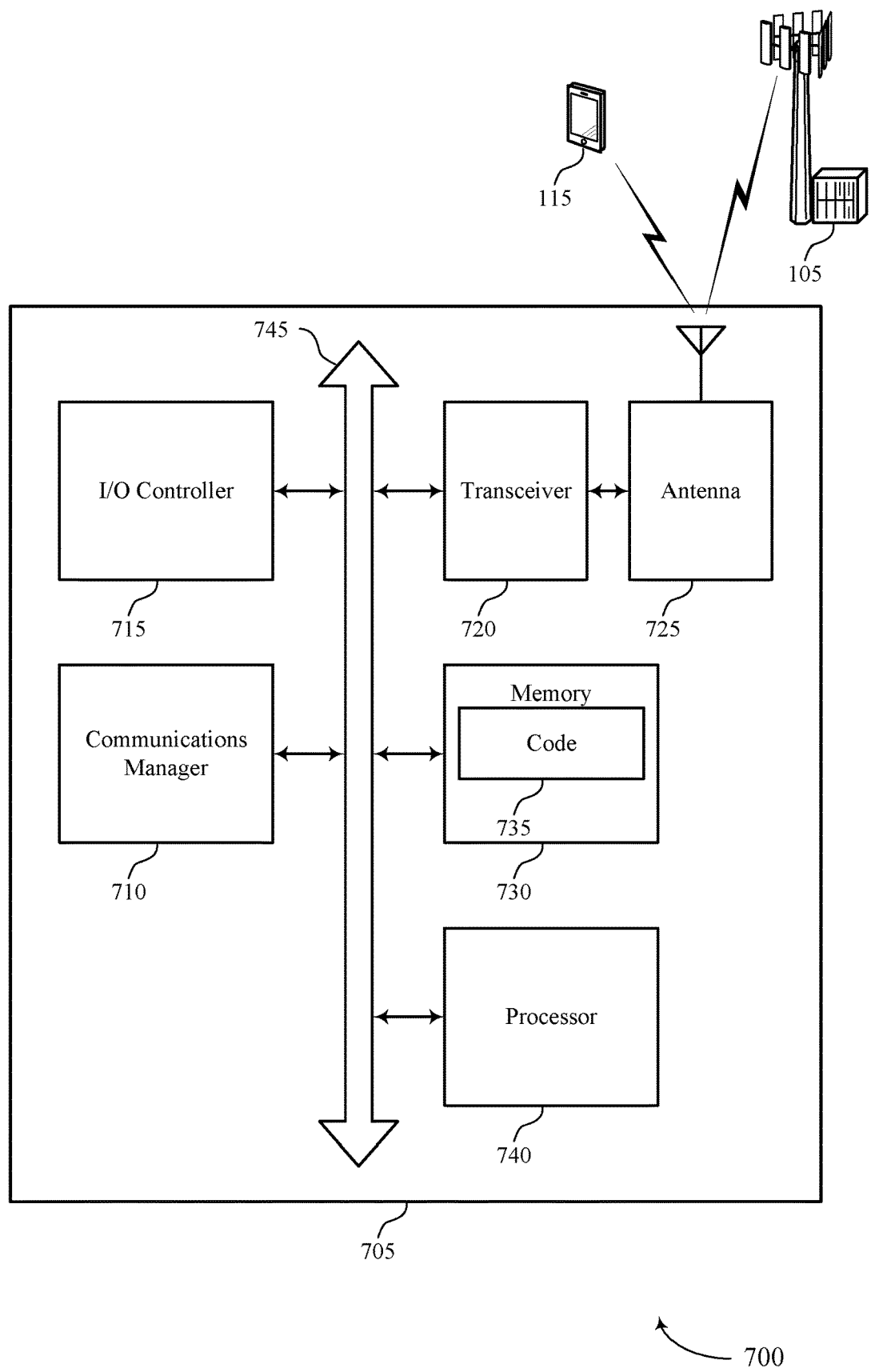
FIG. 7 shows a diagram of a system including a device that supports beam reporting in a BFRQ or a BFR procedure in accordance with aspects of the present disclosure.

FIG. 7 shows a diagram of a system 700 including a device 705 that supports beam reporting in a BFRQ or a BFR procedure in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may detect a beam failure of a beam used for communicating with a base station, identify one or more candidate beams available for communicating with the base station, the one or more candidate beams being different from the failed beam, and refrain from transmitting a beam report identifying a new beam for communicating with the base station based on a quality of each of the candidate beams being lower than a beam identification threshold. The communications manager 710 may also detect a beam failure of a beam used for communicating with a base station, identify one or more candidate beams available for communicating with the base station, the one or more candidate beams being different from the failed beam, compare a quality of each of the candidate beams to a beam detection threshold in an attempt to identify a new beam for communicating with the base station, and perform beam reporting based on the comparing.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting beam reporting in a BFRQ or a BFR procedure).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
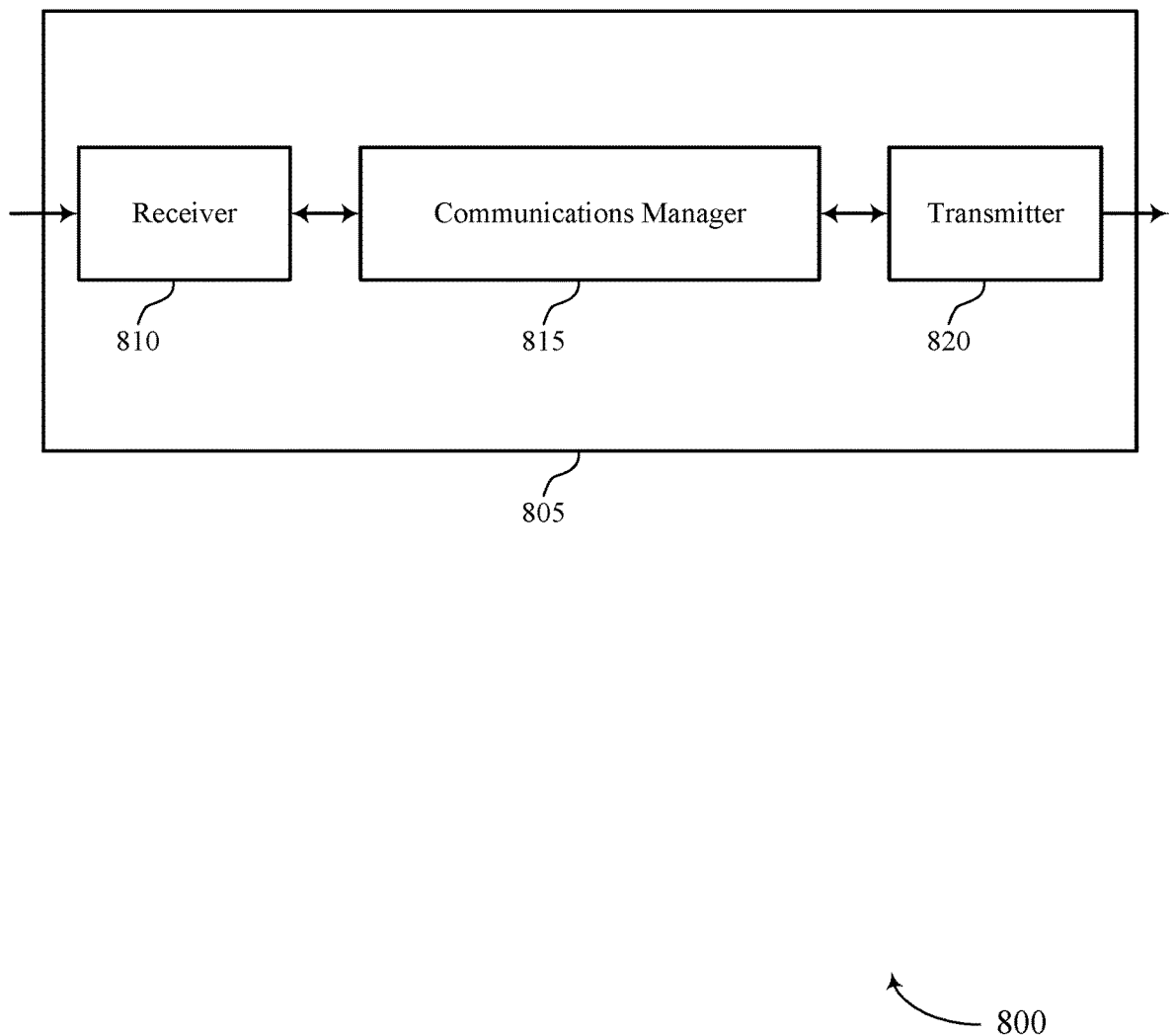
FIGS. 8 and 9 show block diagrams of devices that support beam reporting in a BFRQ or a BFR procedure in accordance with aspects of the present disclosure.

FIG. 8 shows a block diagram 800 of a device 805 that supports beam reporting in a BFRQ or a BFR procedure in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to beam reporting in a BFRQ or a BFR procedure, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a beam used for communicating with a UE, transmit a beam reporting configuration to the UE indicating whether the UE should transmit an indication of a quality of a new beam along with an indication of the new beam in a beam report when the beam used for communicating with the UE fails, and receive the beam report from the UE in accordance with the beam reporting configuration when the beam used for communicating with the UE fails. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
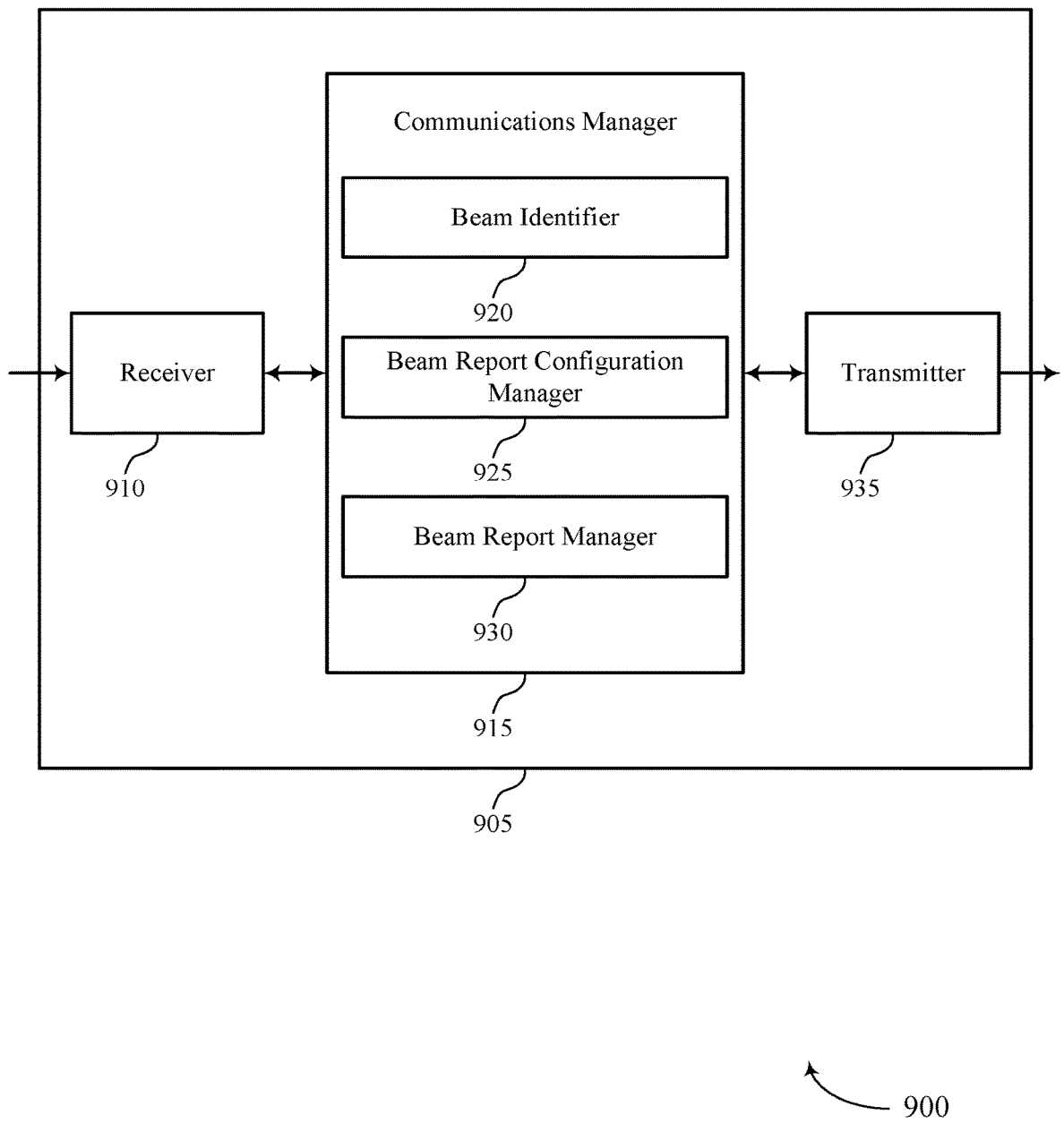

FIG. 9 shows a block diagram 900 of a device 905 that supports beam reporting in a BFRQ or a BFR procedure in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to beam reporting in a BFRQ or a BFR procedure, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a beam identifier 920, a beam report configuration manager 925, and a beam report manager 930. The communications manager 915 may be an example of aspects of the communications manager 1110 described herein.

The beam identifier 920 may identify a beam used for communicating with a UE. The beam report configuration manager 925 may transmit a beam reporting configuration to the UE indicating whether the UE should transmit an indication of a quality of a new beam along with an indication of the new beam in a beam report when the beam used for communicating with the UE fails. The beam report manager 930 may receive the beam report from the UE in accordance with the beam reporting configuration when the beam used for communicating with the UE fails.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
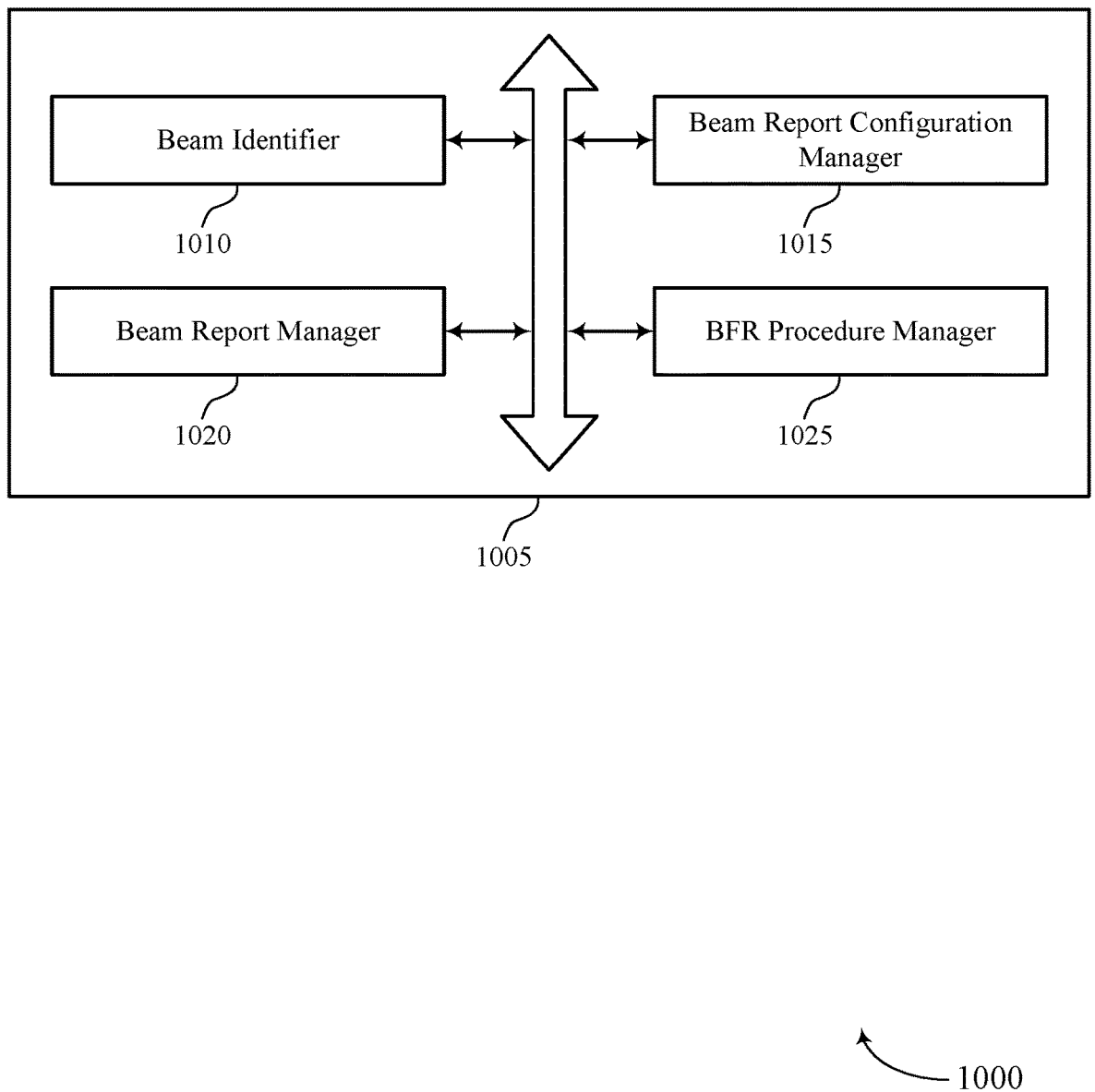
FIG. 10 shows a block diagram of a communications manager that supports beam reporting in a BFRQ or a BFR procedure in accordance with aspects of the present disclosure.

FIG. 10 shows a block diagram 1000 of a communications manager 1005 that supports beam reporting in a BFRQ or a BFR procedure in accordance with aspects of the present disclosure. The communications manager 1005 may be an example of aspects of a communications manager 815, a communications manager 915, or a communications manager 1110 described herein. The communications manager 1005 may include a beam identifier 1010, a beam report configuration manager 1015, a beam report manager 1020, and a BFR procedure manager 1025. Each of these modules may communicate, directly or indirectly, with one another (e.g., via one or more buses).

The beam identifier 1010 may identify a beam used for communicating with a UE. The beam report configuration manager 1015 may transmit a beam reporting configuration to the UE indicating whether the UE should transmit an indication of a quality of a new beam along with an indication of the new beam in a beam report when the beam used for communicating with the UE fails. In some examples, the beam report configuration manager 1015 may transmit the beam reporting configuration indicating that the UE should transmit the indication of the quality of the new beam along with the indication of the new beam in the beam report when the beam used for communicating with the UE fails. In some examples, the beam report configuration manager 1015 may transmit the beam reporting configuration indicating that the UE should not transmit the indication of the quality of the new beam along with the indication of the new beam in the beam report when the beam used for communicating with the UE fails.

The beam report manager 1020 may receive the beam report from the UE in accordance with the beam reporting configuration when the beam used for communicating with the UE fails. In some examples, the beam report manager 1020 may receive the beam report indicating the new beam to be used for communicating with the UE and the quality of the new beam when the beam used for communicating with the UE fails. In some examples, the beam report manager 1020 may receive the beam report indicating the new beam to be used for communicating with the UE when the beam used for communicating with the UE fails, where the beam report does not indicate the quality of the new beam.

In some examples, the beam report manager 1020 may receive the beam report indicating that no new beam is identified by the UE for communicating with the base station. In some examples, the beam report manager 1020 may receive a reserved beam index value or a reserved beam quality value in the beam report indicating that no new beam is identified by the UE for communicating with the base station. In some examples, the beam report manager 1020 may receive the beam report indicating that no new beam is identified for communicating with the base station and that communications with the base station is unrecoverable. The BFR procedure manager 1025 may initiate a beam failure recovery procedure based on receiving the beam report. In some examples, the BFR procedure manager 1025 may refrain from initiating a beam failure recovery procedure based on receiving the beam report.

Figure 11:
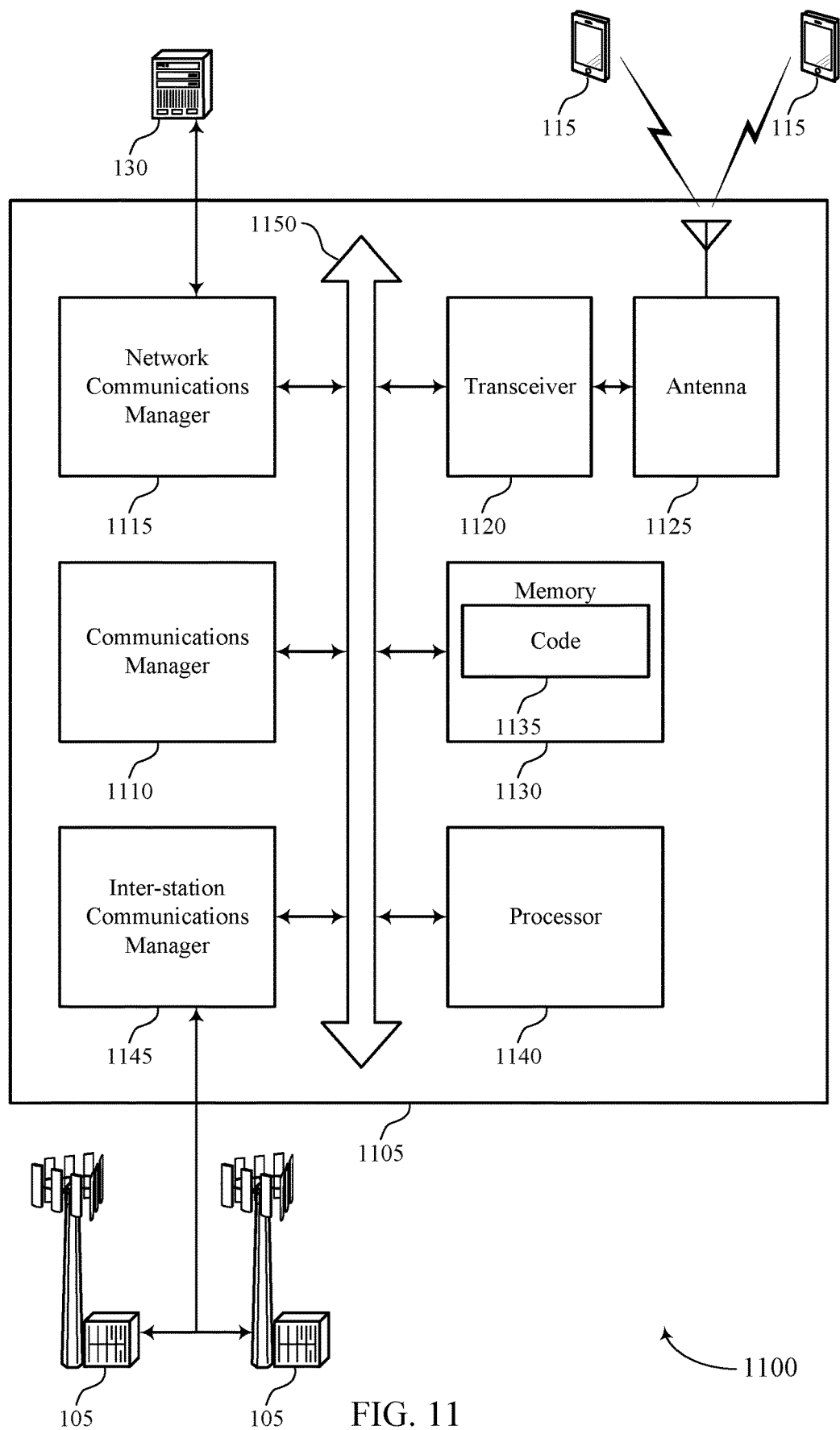
FIG. 11 shows a diagram of a system including a device that supports beam reporting in a BFRQ or a BFR procedure in accordance with aspects of the present disclosure.

FIG. 11 shows a diagram of a system 1100 including a device 1105 that supports beam reporting in a BFRQ or a BFR procedure in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may identify a beam used for communicating with a UE, transmit a beam reporting configuration to the UE indicating whether the UE should transmit an indication of a quality of a new beam along with an indication of the new beam in a beam report when the beam used for communicating with the UE fails, and receive the beam report from the UE in accordance with the beam reporting configuration when the beam used for communicating with the UE fails.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting beam reporting in a BFRQ or a BFR procedure).

The inter-station communications manager 1145 may manage communications with other base station 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
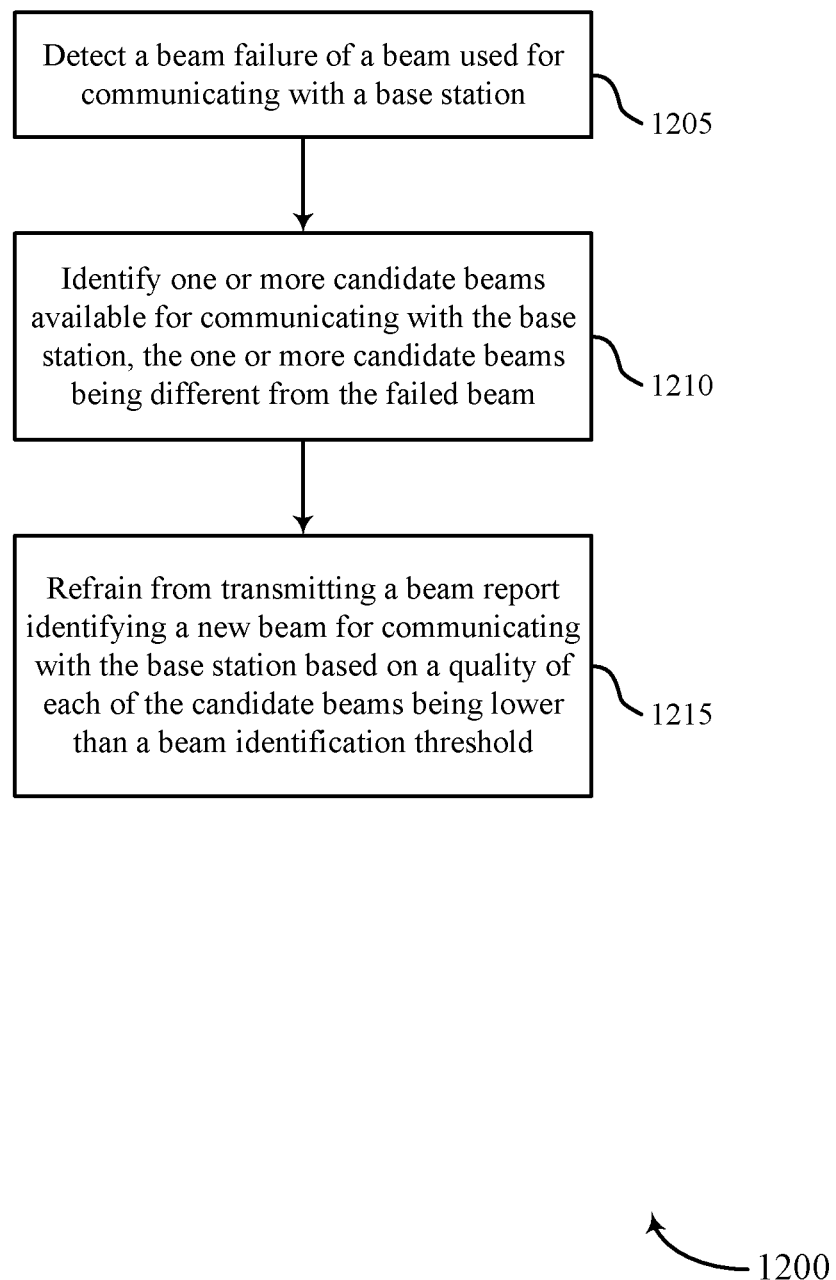
FIGS. 12-14 show flowcharts illustrating methods that support beam reporting in a BFRQ or a BFR procedure in accordance with aspects of the present disclosure.

FIG. 12 shows a flowchart illustrating a method 1200 that supports beam reporting in a BFRQ or a BFR procedure in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally, or alternatively, a UE may perform aspects of the functions described herein using special-purpose hardware.

At 1205, the UE may detect a beam failure of a beam used for communicating with a base station. The operations of 1205 may be performed according to the methods described herein. In some examples, aspects of the operations of 1205 may be performed by a beam failure manager as described with reference to FIGS. 4 through 7.

At 1210, the UE may identify one or more candidate beams available for communicating with the base station, the one or more candidate beams being different from the failed beam. The operations of 1210 may be performed according to the methods described herein. In some examples, aspects of the operations of 1210 may be performed by a candidate beam manager as described with reference to FIGS. 4 through 7.

At 1215, the UE may refrain from transmitting a beam report identifying a new beam for communicating with the base station based on a quality of each of the candidate beams being lower than a beam identification threshold. The operations of 1215 may be performed according to the methods described herein. In some examples, aspects of the operations of 1215 may be performed by a beam reporting manager as described with reference to FIGS. 4 through 7.

Figure 13:
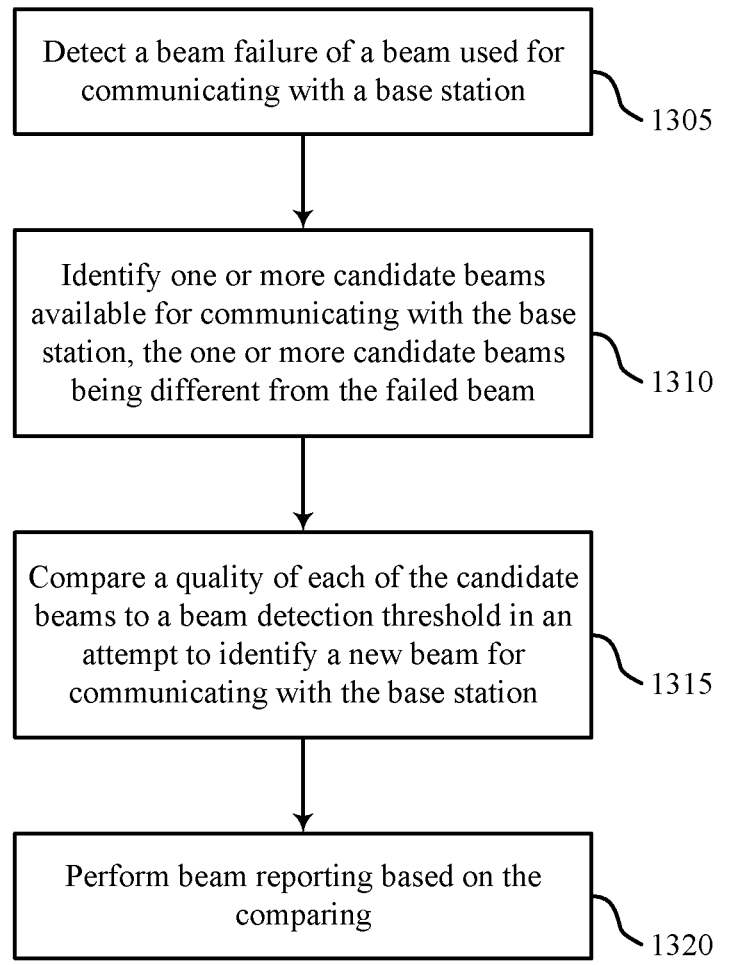

FIG. 13 shows a flowchart illustrating a method 1300 that supports beam reporting in a BFRQ or a BFR procedure in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally, or alternatively, a UE may perform aspects of the functions described herein using special-purpose hardware.

At 1305, the UE may detect a beam failure of a beam used for communicating with a base station. The operations of 1305 may be performed according to the methods described herein. In some examples, aspects of the operations of 1305 may be performed by a beam failure manager as described with reference to FIGS. 4 through 7.

At 1310, the UE may identify one or more candidate beams available for communicating with the base station, the one or more candidate beams being different from the failed beam. The operations of 1310 may be performed according to the methods described herein. In some examples, aspects of the operations of 1310 may be performed by a candidate beam manager as described with reference to FIGS. 4 through 7.

At 1315, the UE may compare a quality of each of the candidate beams to a beam detection threshold in an attempt to identify a new beam for communicating with the base station. The operations of 1315 may be performed according to the methods described herein. In some examples, aspects of the operations of 1315 may be performed by a candidate beam quality manager as described with reference to FIGS. 4 through 7.

At 1320, the UE may perform beam reporting based on the comparing. The operations of 1320 may be performed according to the methods described herein. In some examples, aspects of the operations of 1320 may be performed by a beam reporting manager as described with reference to FIGS. 4 through 7.

Figure 14:
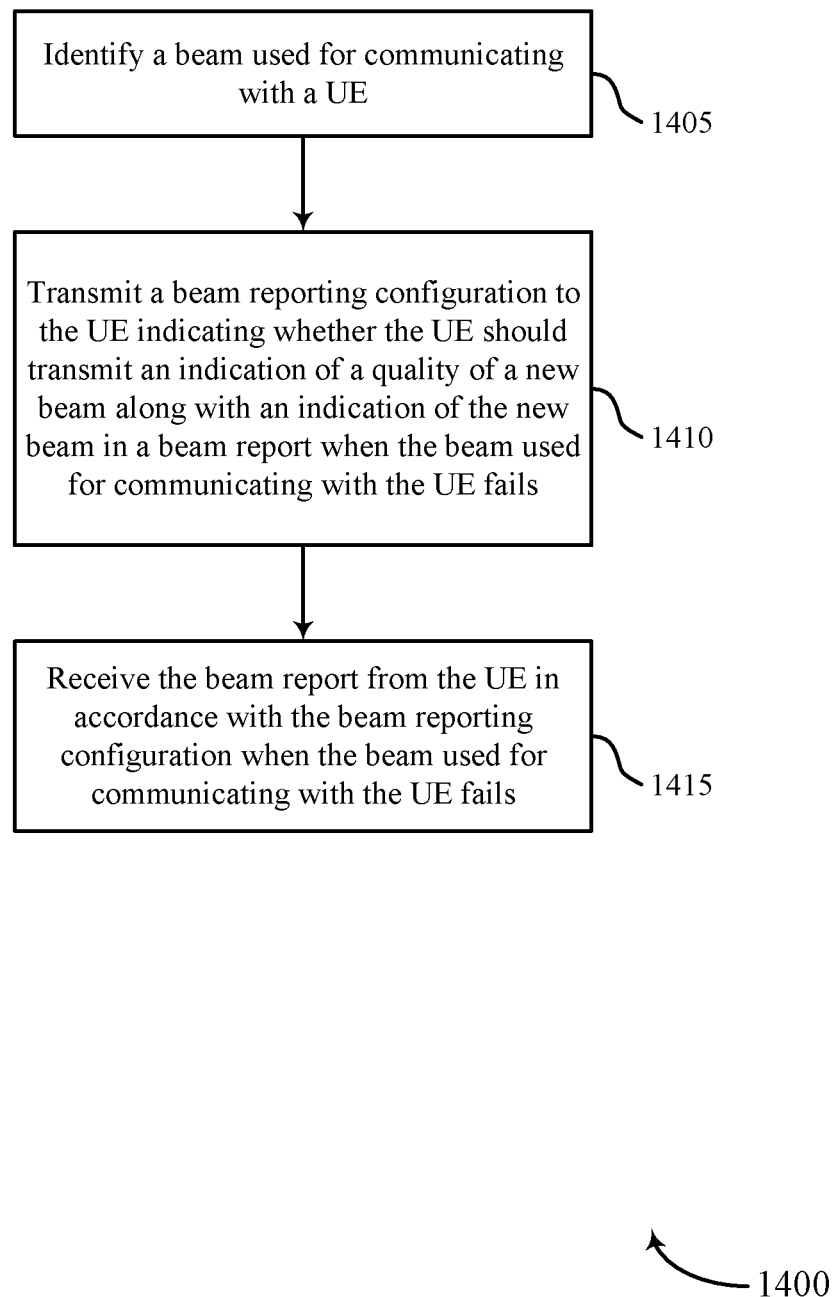

FIG. 14 shows a flowchart illustrating a method 1400 that supports beam reporting in a BFRQ or a BFR procedure in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described herein. Additionally, or alternatively, a base station may perform aspects of the functions described herein using special-purpose hardware.

At 1405, the base station may identify a beam used for communicating with a UE. The operations of 1405 may be performed according to the methods described herein. In some examples, aspects of the operations of 1405 may be performed by a beam identifier as described with reference to FIGS. 8 through 11.

At 1410, the base station may transmit a beam reporting configuration to the UE indicating whether the UE should transmit an indication of a quality of a new beam along with an indication of the new beam in a beam report when the beam used for communicating with the UE fails. The operations of 1410 may be performed according to the methods described herein. In some examples, aspects of the operations of 1410 may be performed by a beam report configuration manager as described with reference to FIGS. 8 through 11.

At 1415, the base station may receive the beam report from the UE in accordance with the beam reporting configuration when the beam used for communicating with the UE fails. The operations of 1415 may be performed according to the methods described herein. In some examples, aspects of the operations of 1415 may be performed by a beam report manager as described with reference to FIGS. 8 through 11.

Figure 15:
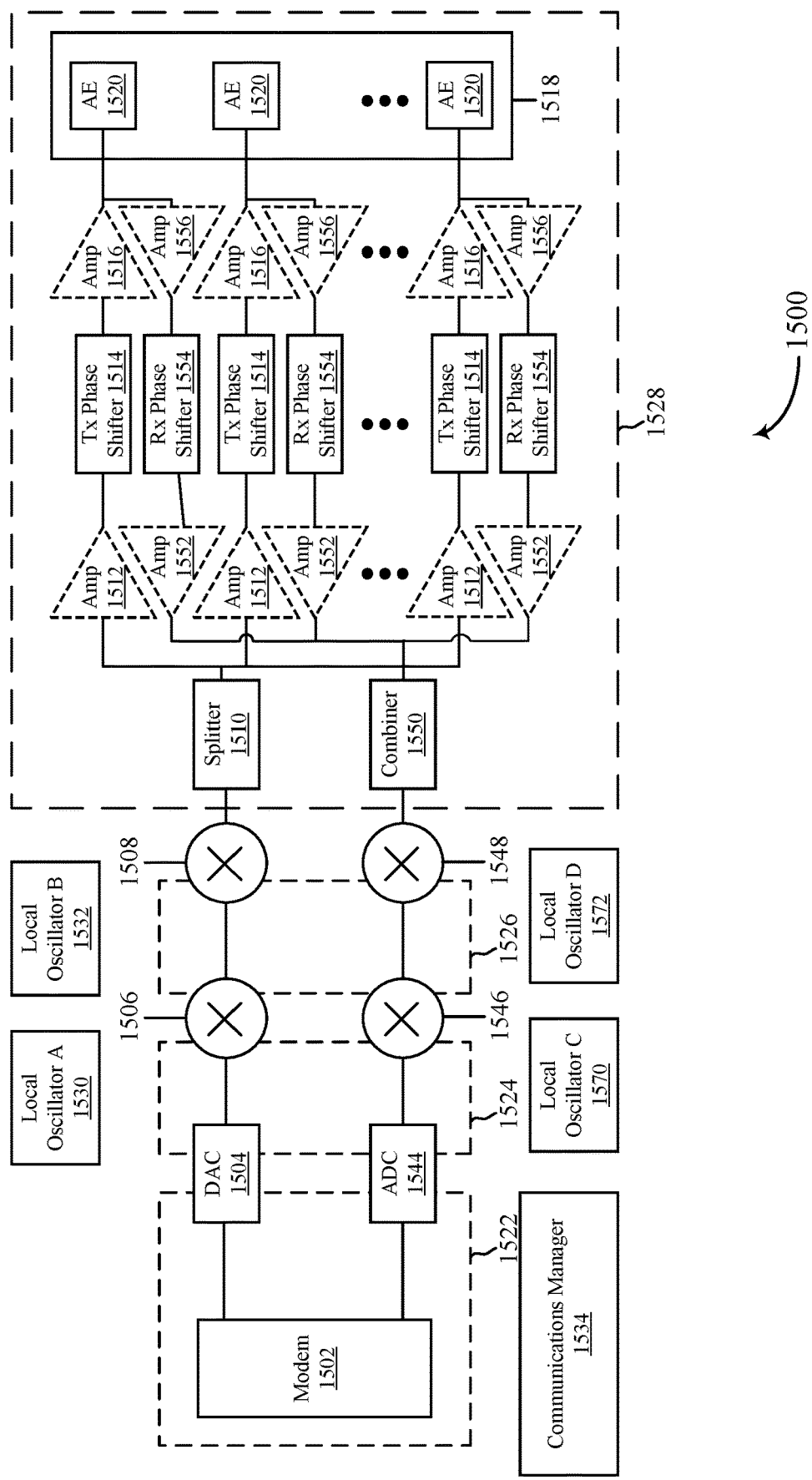
FIG. 15 illustrates an example of an architecture that supports beam reporting in a BFRQ or BFR procedure in accordance with aspects of the present disclosure.

FIG. 15 illustrates an example of an architecture FIG. 1500 that supports determining sub-dominant clusters in a mmW channel in accordance with aspects of the present disclosure. In some examples, architecture FIG. 1500 may implement aspects of wireless communication systems 100 or 200 or process flow 300. In some aspects, diagram 1500 may be an example of the transmitting device (e.g., a first wireless device) or a receiving device (e.g., a second wireless device) as described herein.

Broadly, FIG. 15 is a diagram illustrating example hardware components of a wireless device in accordance with particular aspects of the disclosure. The illustrated components may include those that may be used for antenna element selection or for beamforming for transmission of wireless signals. There are numerous architectures for antenna element selection and implementing phase shifting, one example of which is illustrated here. The architecture 1500 includes a modem (modulator/demodulator) 1502, a digital to analog converter (DAC) 1504, a first mixer 1506, a second mixer 1508, and a splitter 1510. The architecture 1500 also includes a plurality of first amplifiers 1512, a plurality of phase shifters 1514, a plurality of second amplifiers 1516, and an antenna array 1518 that includes a plurality of antenna elements 1520. Transmission lines or other waveguides, wires, traces, or the like are shown connecting the various components to illustrate how signals to be transmitted may travel between components. Boxes 1522, 1524, 1526, and 1528 indicate regions in the architecture 1500 in which different types of signals travel or are processed. Specifically, box 1522 indicates a region in which digital baseband signals travel or are processed, box 1524 indicates a region in which analog baseband signals travel or are processed, box 1526 indicates a region in which analog intermediate frequency (IF) signals travel or are processed, and box 1528 indicates a region in which analog radio frequency (RF) signals travel or are processed. The architecture also includes a local oscillator A 1530, a local oscillator B 1532, and a communications manager 1534.

Each of the antenna elements 1520 may include one or more sub-elements (not shown) for radiating or receiving RF signals. For example, a single antenna element 1520 may include a first sub-element cross-polarized with a second sub-element that can be used to independently transmit cross-polarized signals. The antenna elements 1520 may include patch antennas or other types of antennas arranged in a linear, two dimensional, or other pattern. A spacing between antenna elements 1520 may be such that signals with a desired wavelength transmitted separately by the antenna elements 1520 may interact or interfere (e.g., to form a desired beam). For example, given an expected range of wavelengths or frequencies, the spacing may provide a quarter wavelength, half wavelength, or other fraction of a wavelength of spacing between neighboring antenna elements 1520 to allow for interaction or interference of signals transmitted by the separate antenna elements 1520 within that expected range.

The modem 1502 processes and generates digital baseband signals and may also control operation of the DAC 1504, first and second mixers 1506, 1508, splitter 1510, first amplifiers 1512, phase shifters 1514, or the second amplifiers 1516 to transmit signals via one or more or all of the antenna elements 1520. The modem 1502 may process signals and control operation in accordance with a communication standard such as a wireless standard discussed herein. The DAC 1504 may convert digital baseband signals received from the modem 1502 (and that are to be transmitted) into analog baseband signals. The first mixer 1506 upconverts analog baseband signals to analog IF signals within an IF using a local oscillator A 1530. For example, the first mixer 1506 may mix the signals with an oscillating signal generated by the local oscillator A 1530 to "move" the baseband analog signals to the IF. In some cases, some processing or filtering (not shown) may take place at the IF. The second mixer 1508 upconverts the analog IF signals to analog RF signals using the local oscillator B 1532. Similarly to the first mixer, the second mixer 1508 may mix the signals with an oscillating signal generated by the local oscillator B 1532 to "move" the IF analog signals to the RF, or the frequency at which signals will be transmitted or received. The modem 1502 or the communications manager 1534 may adjust the frequency of local oscillator A 1530 or the local oscillator B 1532 so that a desired IF or RF frequency is produced and used to facilitate processing and transmission of a signal within a desired bandwidth.

In the illustrated architecture 1500, signals upconverted by the second mixer 1508 are split or duplicated into multiple signals by the splitter 1510. The splitter 1510 in architecture 1500 splits the RF signal into a plurality of identical or nearly identical RF signals, as denoted by its presence in box 1528. In other examples, the split may take place with any type of signal including with baseband digital, baseband analog, or IF analog signals. Each of these signals may correspond to an antenna element 1520 and the signal travels through and is processed by amplifiers 1512, 1516, phase shifters 1514, or other elements corresponding to the respective antenna element 1520 to be provided to and transmitted by the corresponding antenna element 1520 of the antenna array 1518. In one example, the splitter 1510 may be an active splitter that is connected to a power supply and provides some gain so that RF signals exiting the splitter 1510 are at a power level equal to or greater than the signal entering the splitter 1510. In another example, the splitter 1510 is a passive splitter that is not connected to power supply and the RF signals exiting the splitter 1510 may be at a power level lower than the RF signal entering the splitter 1510.

After being split by the splitter 1510, the resulting RF signals may enter an amplifier, such as a first amplifier 1512, or a phase shifter 1514 corresponding to an antenna element 1520. The first and second amplifiers 1512, 1516 are illustrated with dashed lines because one or both of them might not be used in some implementations. In one implementation, both the first amplifier 1512 and second amplifier 1514 are present. In another, neither the first amplifier 1512 nor the second amplifier 1514 is present. In other implementations, one of the two amplifiers 1512, 1514 is present but not the other. By way of example, if the splitter 1510 is an active splitter, the first amplifier 1512 may not be used. By way of further example, if the phase shifter 1514 is an active phase shifter that can provide a gain, the second amplifier 1516 might not be used. The amplifiers 1512, 1516 may provide a desired level of positive or negative gain. A positive gain (positive dB) may be used to increase an amplitude of a signal for radiation by a specific antenna element 1520. A negative gain (negative dB) may be used to decrease an amplitude or suppress radiation of the signal by a specific antenna element. Each of the amplifiers 1512, 1516 may be controlled independently (e.g., by the modem 1502 or communications manager 1534) to provide independent control of the gain for each antenna element 1520. For example, the modem 1502 or the communications manager 1534 may have at least one control line connected to each of the splitter 1510, first amplifiers 1512, phase shifters 1514, or second amplifiers 1516 which may be used to configure a gain to provide a desired amount of gain for each component and thus each antenna element 1520.

The phase shifter 1514 may provide a configurable phase shift or phase offset to a corresponding RF signal to be transmitted. The phase shifter 1514 could be a passive phase shifter not directly connected to a power supply. Passive phase shifters might introduce some insertion loss. The second amplifier 1516 could boost the signal to compensate for the insertion loss. The phase shifter 1514 could be an active phase shifter connected to a power supply such that the active phase shifter provides some amount of gain or prevents insertion loss. The settings of each of the phase shifters 1514 are independent meaning that each can be set to provide a desired amount of phase shift or the same amount of phase shift or some other configuration. The modem 1502 or the communications manager 1534 may have at least one control line connected to each of the phase shifters 1514 and which may be used to configure the phase shifters 1514 to provide a desired amounts of phase shift or phase offset between antenna elements 1520.

In the illustrated architecture 1500, RF signals received by the antenna elements 1520 are provided to one or more of first amplifier 1556 to boost the signal strength. The first amplifier 1556 may be connected to the same antenna arrays 1518, e.g., for TDD operations. The first amplifier 1556 may be connected to different antenna arrays 1518. The boosted RF signal is input into one or more of phase shifter 1554 to provide a configurable phase shift or phase offset for the corresponding received RF signal. The phase shifter 1554 may be an active phase shifter or a passive phase shifter. The settings of the phase shifters 1554 are independent, meaning that each can be set to provide a desired amount of phase shift or the same amount of phase shift or some other configuration. The modem 1502 or the communications manager 1534 may have at least one control line connected to each of the phase shifters 1554 and which may be used to configure the phase sifters 1554 to provide a desired amount of phase shift or phase offset between antenna elements 1520.

The outputs of the phase shifters 1554 may be input to one or more second amplifiers 1552 for signal amplification of the phase shifted received RF signals. The second amplifiers 1552 may be individually configured to provide a configured amount of gain. The second amplifiers 1552 may be individually configured to provide an amount of gain to ensure that the signal input to combiner 1550 have the same magnitude. The amplifiers 1552 or 1556 are illustrated in dashed lines because they might not be used in some implementations. In one implementation, both the amplifier 1552 and the amplifier 1556 are present. In another, neither the amplifier 1552 nor the amplifier 1556 are present. In other implementations, one of the amplifiers 1552, 1556 is present but not the other.

In the illustrated architecture 1500, signals output by the phase shifters 1554 (via the amplifiers 1552 when present) are combined in combiner 1550. The combiner 1550 in architecture combines the RF signal into a signal, as denoted by its presence in box 1528. The combiner 1550 may be a passive combiner, e.g., not connected to a power source, which may result in some insertion loss. The combiner 1550 may be an active combiner, e.g., connected to a power source, which may result in some signal gain. When combiner 1550 is an active combiner, it may provide a different (e.g., configurable) amount of gain for each input signal so that the input signals have the same magnitude when they are combined. When combiner 1550 is an active combiner, it may not use the second amplifier 1552 because the active combiner may provide the signal amplification.

The output of the combiner 1550 is input into mixers 1548 and 1546. Mixers 1548 and 1546 generally down convert the received RF signal using inputs from local oscillators 1572 and 1570, respectively, to create intermediate or baseband signals that carry the encoded and modulated information. The output of the mixers 1548 and 1546 are input into an analog-to-digital converter (ADC) 1544 for conversion to analog signals. The analog signals output from ADC 1544 is input to modem 1502 for baseband processing, e.g., decoding, de-interleaving, etc.

The architecture 1500 is given by way of example to illustrate an architecture for transmitting or receiving signals. It will be understood that the architecture 1500 or each portion of the architecture 1500 may be repeated multiple times within an architecture to accommodate or provide an arbitrary number of RF chains, antenna elements, or antenna panels. Furthermore, numerous alternate architectures are possible and contemplated. For example, although only a single antenna array 1518 is shown, two, three, or more antenna arrays may be included each with one or more of their own corresponding amplifiers, phase shifters, splitters, mixers, DACs, ADCs, or modems. For example, a single UE may include two, four or more antenna arrays for transmitting or receiving signals at different physical locations on the UE or in different directions. Furthermore, mixers, splitters, amplifiers, phase shifters and other components may be located in different signal type areas (e.g., different ones of the boxes 1522, 1524, 1526, 1528) in different implemented architectures. For example, a split of the signal to be transmitted into a plurality of signals may take place at the analog RF, analog IF, analog baseband, or digital baseband frequencies in different examples. Similarly, amplification, or phase shifts may also take place at different frequencies. For example, in some contemplated implementations, one or more of the splitter 1510, amplifiers 1512, 1516, or phase shifters 1514 may be located between the DAC 1504 and the first mixer 1506 or between the first mixer 1506 and the second mixer 1508. In one example, the functions of one or more of the components may be combined into one component. For example, the phase shifters 1514 may perform amplification to include or replace the first or second amplifiers 1512, 1516. By way of another example, a phase shift may be implemented by the second mixer 1508 to obviate the use of a separate phase shifter 1514. This technique is sometimes called local oscillator (LO) phase shifting. In one implementation of this configuration, there may be a plurality of IF to RF mixers (e.g., for each antenna element chain) within the second mixer 1508 and the local oscillator B 1532 would supply different local oscillator signals (with different phase offsets) to each IF to RF mixer.

The modem 1502 or the communications manager 1534 may control one or more of the other components 1504-1572 to select one or more antenna elements 1520 or to form beams for transmission of one or more signals. For example, the antenna elements 1520 may be individually selected or deselected for transmission of a signal (or signals) by controlling an amplitude of one or more corresponding amplifiers, such as the first amplifiers 1512 or the second amplifiers 1516. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 1520, the radiated signals interact, interfere (constructive and destructive interference), and amplify each other to form a resulting beam. The shape (such as the amplitude, width, or presence of side lobes) and the direction (such as an angle of the beam relative to a surface of the antenna array 1518) can be dynamically controlled by modifying the phase shifts or phase offsets imparted by the phase shifters 1514 and amplitudes imparted by the amplifiers 1512, 1516 of the plurality of signals relative to each other.

The communications manager 1534 may, when architecture 1500 is configured as a receiving device, transmit a first beam measurement report to a first wireless device, the first beam measurement report indicating a first set of beam measurements for a wireless channel between the first wireless device and the second wireless device. The communications manager 1534 may receive from the first wireless device a cluster validity metric for at least one beam in the first beam measurement report. The communications manager 1534 may transmit to the first wireless device a second beam measurement report based at least in part on the cluster validity metric, the second beam measurement report indicating a second set of beam measurements for the wireless channel, as discussed herein. The communications manager 1534 may, when architecture 1500 is configured as a transmitting device, receive a first beam measurement report from a second wireless device, the first beam measurement report indicating a first set of beam measurements for a wireless channel between the first wireless device and the second wireless device. The communications manager 1534 may transmit to the second wireless device a cluster validity metric for at least one beam in the first beam measurement report. The communications manager 1534 may receive from the second wireless device, in response to transmitting the cluster validity metric, a second beam measurement report indicating a second set of beam measurements for the wireless channel. The communications manager 1534 may select a beam for transmitting to the second wireless device based at least in part on the first and second beam measurement reports, as discussed herein. The communications manager 1534 may be located partially or fully within one or more other components of the architecture 1500. For example, the communications manager 1534 may be located within the modem 1502 in at least one implementation.

The following examples are given by way of illustration, and aspects of the following examples may be combined with aspects or embodiments shown or discussed in relation to the figures or elsewhere herein.

Example 1 is a method for wireless communication at a UE. The method may include detecting a beam failure of a beam used for communicating with a base station, identifying one or more candidate beams available for communicating with the base station, the one or more candidate beams being different from the failed beam, and refraining from transmitting a beam report identifying a new beam for communicating with the base station based on a quality of each of the candidate beams being lower than a beam identification threshold.

In example 2, the method of example 1 includes comparing the quality of each of the candidate beams to the beam identification threshold based on detecting the beam failure, and determining that the quality of each of the candidate beams may be lower than the beam identification threshold, where the refraining may be based on the determining.

In example 3, the method of any of examples 1-2 further includes measuring the quality of each of the candidate beams.

In example 4, the method of any of examples 1-3 further includes that the quality of each of the candidate beams includes a reference signal received power.

In example 5, the method of any of examples 1-4 further includes receiving a beam reporting configuration indicating whether the UE should transmit an indication of a quality of a new beam to be used for communicating with the base station in a beam report.

In example 6, the method of any of examples 1-5 further includes that the base station includes a secondary cell.

Example 7 is a system or apparatus including means for implementing a method or realizing an apparatus as in any of examples 1-6.

Example 8 is a non-transitory computer readable medium storing instructions executable by one or more processors to cause to one or more processors to implement a method as in any of examples 1-6.

Example 9 is a system including one or more processors and memory in electronic communication with the one or more processors storing instructions executable by the one or more processors to cause the system or apparatus to implement a method as in any of examples 1-6.

Example 10 is a method of wireless communication at a UE that includes detecting a beam failure of a beam used for communicating with a base station, identifying one or more candidate beams available for communicating with the base station, the one or more candidate beams being different from the failed beam, comparing a quality of each of the candidate beams to a beam detection threshold in an attempt to identify a new beam for communicating with the base station, and performing beam reporting based on the comparing.

In example 11, the method of example 10 further includes determining that the quality of a candidate beam of the one or more candidate beams may be above the detection threshold, and transmitting a beam report identifying the candidate beam as the new beam for communicating with the base station regardless of whether the quality of the candidate beam of the one or more candidate beams may be above or below a beam identification threshold.

In example 12, the method of any of examples 10-11 further includes transmitting, to the base station, a BFRQ comprising an indication of the beam failure, receiving an uplink grant from the base station, and transmitting the beam report in or after the BFRQ to the base station based on the uplink grant, where the beam report includes MAC-CE signaling.

In example 13, the method of any of examples 10-12 further includes receiving a beam reporting configuration indicating whether the UE should transmit an indication of the quality of the candidate beam of the one or more candidate beams in the beam report.

In example 14, the method of any of examples 10-13 further includes determining that the beam reporting configuration indicates that the UE should transmit the indication of the quality of the candidate beam of the one or more candidate beams in the beam report, and transmitting the indication of the quality of the candidate beam of the one or more candidate beams in the beam report based on the determining.

In example 15, the method of any of examples 10-14 further includes that the detection threshold may be based on a capability of the UE and may be different from the beam identification threshold.

In examples 16, the method of any of examples 10-15 further includes determining that the quality of each of the candidate beams may be lower than the detection threshold, where the attempt to identify the new beam for communicating with the base station may have failed.

In example 17, the method of any of examples 10-16 further includes refraining from transmitting a beam report identifying a new beam for communicating with the base station based on the determining.

In example 18, the method of any of examples 10-17 further includes transmitting a beam report indicating that no new beam may be identified for communicating with the base station.

In example 19, the method of any of examples 10-18 further includes transmitting a reserved beam index value or a reserved beam quality value in the beam report to indicate that no new beam may be identified for communicating with the base station.

In example 20, the method of any of examples 10-19 further includes transmitting a beam report indicating that no new beam may be identified for communicating with the base station and that communications with the base station may be unrecoverable.

Example 21 is a system or apparatus including means for implementing a method or realizing an apparatus of any of examples 10-19.

Example 22 is a non-transitory computer-readable medium storing instructions executable by one or more processors to cause the one or more processors to implement a method as in any of examples 10-19.

Example 23 is a system including one or more processors and memory in electronic communication with the one or more processors storing instructions executable by the one or more processors to cause the system or apparatus to implement a method as in any of examples 10-19.

Example 24 is a method for wireless communication at a base station that includes identifying a beam used for communicating with a UE, transmitting a beam reporting configuration to the UE indicating whether the UE should transmit an indication of a quality of a new beam along with an indication of the new beam in a beam report when the beam used for communicating with the UE fails, and receiving the beam report from the UE in accordance with the beam reporting configuration when the beam used for communicating with the UE fails.

In example 25, the method of example 24 includes transmitting the beam reporting configuration indicating that the UE should transmit the indication of the quality of the new beam along with the indication of the new beam in the beam report when the beam used for communicating with the UE fails, and receiving the beam report indicating the new beam to be used for communicating with the UE and the quality of the new beam when the beam used for communicating with the UE fails.

In example 26, the method of any of examples 24-25 further includes transmitting the beam reporting configuration indicating that the UE should not transmit the indication of the quality of the new beam along with the indication of the new beam in the beam report when the beam used for communicating with the UE fails, and receiving the beam report indicating the new beam to be used for communicating with the UE when the beam used for communicating with the UE fails, where the beam report does not indicate the quality of the new beam.

In example 27, the method of any of examples 24-26 further includes receiving the beam report indicating that no new beam may be identified by the UE for communicating with the base station, and initiating a beam failure recovery procedure based on receiving the beam report.

In example 28, the method of any of examples 24-27 further includes receiving the beam report indicating that no new beam may be identified by the UE for communicating with the base station may include operations, features, means, or instructions for receiving a reserved beam index value or a reserved beam quality value in the beam report indicating that no new beam may be identified by the UE for communicating with the base station.

In example 29, the method of any of examples 24-28 further includes receiving the beam report indicating that no new beam may be identified for communicating with the base station and that communications with the base station may be unrecoverable, and refraining from initiating a beam failure recovery procedure based on receiving the beam report.

Example 30 is a system of apparatus including means for implementing a method or realizing an apparatus as in any of examples 24-30.

Example 31 is a non-transitory computer-readable medium storing instructions executable by one or more processors to cause the one or more processors to implement a method as in any of examples 24-30.

Example 32 is a system including one or more processors and memory in electronic communication with the one or more processors storing instructions executable by the one or more processors to cause the system or apparatus to implement a method as in any of examples 24-30.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   detecting a beam failure of a beam used for communicating with a secondary cell;
   identifying one or more candidate beams available for communicating with the secondary cell, the one or more candidate beams being different from the failed beam;
   comparing a quality of each of the candidate beams to a beam detection threshold in an attempt to identify a new beam for communicating with the secondary cell;
   determining that the quality of each of the candidate beams is lower than the detection threshold; and
   transmitting a reserved beam index value or a reserved beam quality value in a beam report to indicate that no new beam is identified for communicating with the secondary cell.

2. The method of claim 1, wherein transmitting the reserved beam index value or the reserved beam quality value in the beam report comprises:
   transmitting, to a base station, a beam failure recovery request (BFRQ) comprising an indication of the beam failure;
   receiving an uplink grant from the base station; and
   transmitting the reserved beam index value or the reserved beam quality value in the beam report in or after the beam failure recovery request (BFRQ) to the base station based at least in part on the uplink grant, wherein the beam report comprises medium access control-control element (MAC-CE) signaling.

3. The method of claim 1, further comprising:
   receiving a beam reporting configuration indicating whether the UE should transmit an indication of the quality of a candidate beam of the one or more candidate beams in the beam report.

4. The method of claim 3, further comprising:
   determining that the beam reporting configuration indicates that the UE should transmit the indication of the quality of the candidate beam of the one or more candidate beams in the beam report; and
   transmitting the indication of the quality of the candidate beam of the one or more candidate beams in the beam report based at least in part on the determining.

5. The method of claim 1, wherein the detection threshold is based at least in part on a capability of the UE and is different from a beam identification threshold.

6. The method of claim 1, further comprising:
   refraining from transmitting a beam report identifying a new beam for communicating with the secondary cell based at least in part on the determining.

7. The method of claim 1, further comprising:
   transmitting a beam report indicating that no new beam is identified for communicating with the secondary cell and that communications with the secondary cell are unrecoverable.

8. An apparatus for wireless communication at a user equipment (UE), comprising:
   a processor,
   memory in electronic communication with the processor; and
   instructions stored in the memory and executable by the processor to cause the apparatus to:
      detect a beam failure of a beam used for communicating with a secondary cell;
      identify one or more candidate beams available for communicating with the secondary cell, the one or more candidate beams being different from the failed beam;
      compare a quality of each of the candidate beams to a beam detection threshold in an attempt to identify a new beam for communicating with the secondary cell;
      determine that the quality of each of the candidate beams is lower than the detection threshold; and
      transmit a reserved beam index value or a reserved beam quality value in a beam report to indicate that no new beam is identified for communicating with the secondary cell.

9. The apparatus of claim 8, wherein the instructions to transmit the reserved beam index value or the reserved beam quality value in the beam report are executable by the processor to cause the apparatus to:
   transmit, to a base station, a beam failure recovery request (BFRQ) comprising an indication of the beam failure;
   receive an uplink grant from the base station; and
   transmit the reserved beam index value or the reserved beam quality value in the beam report in or after the beam failure recovery request (BFRQ) to the base station, based at least in part on the uplink grant, wherein the beam report comprises medium access control-control element (MAC-CE) signaling.

10. The apparatus of claim 8, wherein the instructions are further executable by the processor to cause the apparatus to:
    receive a beam reporting configuration indicating whether the UE should transmit an indication of the quality of a candidate beam of the one or more candidate beams in the beam report.

11. The apparatus of claim 10, wherein the instructions are further executable by the processor to cause the apparatus to:
    determine that the beam reporting configuration indicates that the UE should transmit the indication of the quality of the candidate beam of the one or more candidate beams in the beam report; and
    transmit the indication of the quality of the candidate beam of the one or more candidate beams in the beam report based at least in part on the determining.

12. The apparatus of claim 8, wherein the detection threshold is based at least in part on a capability of the UE and is different from a beam identification threshold.

13. The apparatus of claim 8, wherein the instructions are further executable by the processor to cause the apparatus to:
    refrain from transmitting a beam report identifying a new beam for communicating with the secondary cell based at least in part on the determining.

14. The apparatus of claim 8, wherein the instructions are further executable by the processor to cause the apparatus to:
    transmit a beam report indicating that no new beam is identified for communicating with the secondary cell and that communications with the secondary cell are unrecoverable.

15. An apparatus for wireless communication at a user equipment (UE), comprising:
    means for detecting a beam failure of a beam used for communicating with a secondary cell;

means for identifying one or more candidate beams available for communicating with the secondary cell, the one or more candidate beams being different from the failed beam;

means for comparing a quality of each of the candidate beams to a beam detection threshold in an attempt to identify a new beam for communicating with the secondary cell;

means for determining that the quality of each of the candidate beams is lower than the detection threshold; and means for transmitting a reserved beam index value or a reserved beam quality value in a beam report to indicate that no new beam is identified for communicating with the secondary cell.

16. A non-transitory computer-readable medium storing code for wireless communication at a user equipment (UE), the code comprising instructions executable by a processor to:

detect a beam failure of a beam used for communicating with a secondary cell;

identify one or more candidate beams available for communicating with the secondary cell, the one or more candidate beams being different from the failed beam;

compare a quality of each of the candidate beams to a beam detection threshold in an attempt to identify a new beam for communicating with the secondary cell;

determine that the quality of each of the candidate beams is lower than the detection threshold; and transmit a reserved beam index value or a reserved beam quality value in a beam report to indicate that no new beam is identified for communicating with the secondary cell.

* * * * *

UNITED STATES PATENT AND TRADEMARK OFFICE
CERTIFICATE OF CORRECTION

| | | |
|---|---|---|
| PATENT NO. | : 11,109,256 B2 | Page 1 of 1 |
| APPLICATION NO. | : 16/742725 | |
| DATED | : August 31, 2021 | |
| INVENTOR(S) | : Zhou et al. | |

It is certified that error appears in the above-identified patent and that said Letters Patent is hereby corrected as shown below:

On the Title Page

Item [73], should read:
QUALCOMM Incorporated, San Diego, CA (US)

Signed and Sealed this
Sixth Day of May, 2025

Coke Morgan Stewart
*Acting Director of the United States Patent and Trademark Office*